United States Patent [19]
Watanabe

[11] Patent Number: 6,088,726
[45] Date of Patent: Jul. 11, 2000

[54] ADDRESS ASSIGNMENT SYSTEM FOR EXTRACTING UNUSED ASSIGNMENT ADDRESSES FROM A COMMUNICATION FRAME CIRCULATING AMONG COMMUNICATION STATIONS

[75] Inventor: Takayuki Watanabe, Shizuoka-ken, Japan

[73] Assignee: Yazaki Corporation, Tokyo, Japan

[21] Appl. No.: 09/206,292

[22] Filed: Dec. 7, 1998

[30] Foreign Application Priority Data

Dec. 8, 1997 [JP] Japan ..................................... 9-337394

[51] Int. Cl.[7] .......................... G06F 15/177; G06F 15/16
[52] U.S. Cl. ......................... 709/220; 709/222; 709/245
[58] Field of Search ................................... 709/220, 222, 709/245, 219; 710/104; 703/23

[56] References Cited

U.S. PATENT DOCUMENTS

| | | | |
|---|---|---|---|
| 5,150,464 | 9/1992 | Sidhu et al. ............................. | 709/222 |
| 5,408,618 | 4/1995 | Aho et al. ................................ | 710/104 |
| 5,598,536 | 1/1997 | Slaughter, III et al. ................ | 709/219 |
| 5,812,819 | 9/1998 | Rodwin et al. .......................... | 703/23 |

FOREIGN PATENT DOCUMENTS 3-72740   3/1991   Japan .
4-326896  11/1992  Japan .

*Primary Examiner*—Le Hien Luu
*Attorney, Agent, or Firm*—Oblon, Spivak, McClelland, Maier & Neustadt, P.C.

[57] ABSTRACT

When a destination communication station receives a communication frame which contains a destination address matching an address of the destination communication station and whose assignment address description area contains unused assignment addresses, the destination communication station extracts one of the unused assignment addresses, generates the communication frame whose assignment address description area has been updated by extracting the assignment address, updates the address stored in an address storage area with the extracted assignment address to set up an assignment of the address of the station, and sends the generated communication frame to the next communication station so that the communication frame circulates among a plurality of communication stations.

24 Claims, 9 Drawing Sheets

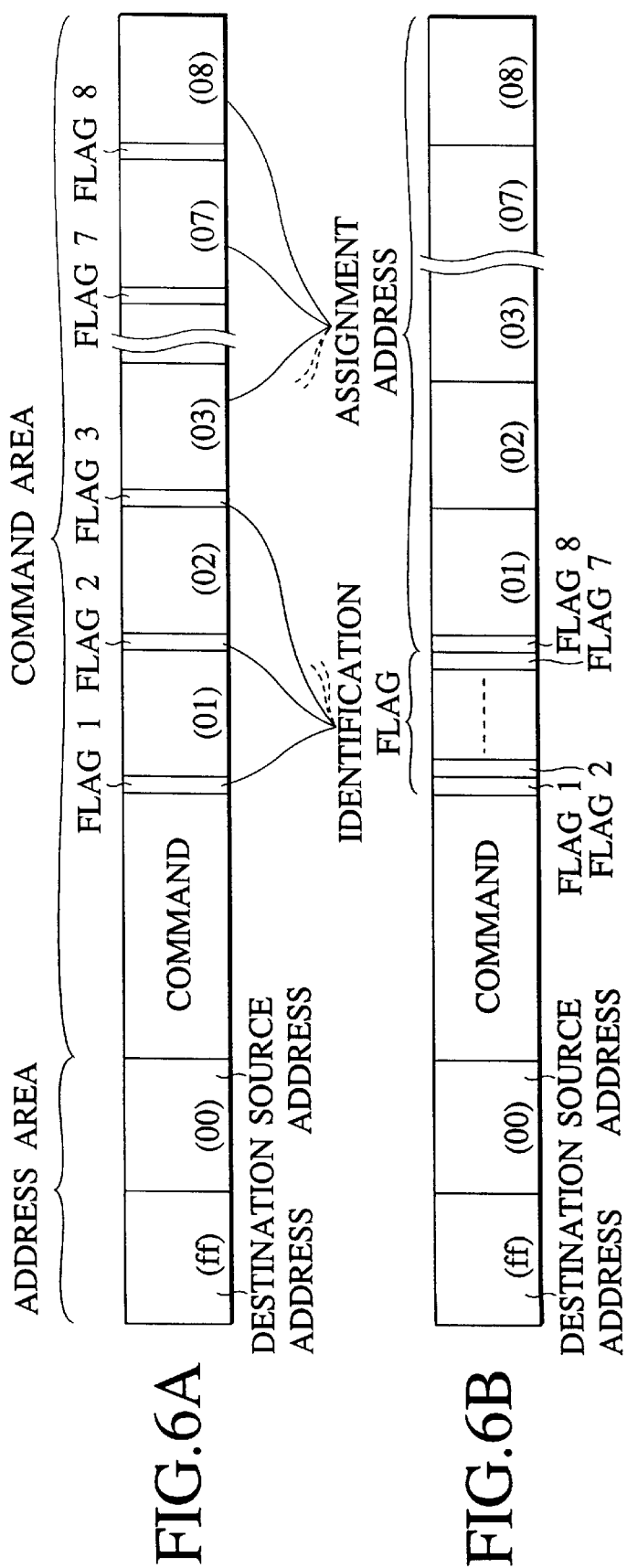

ADDRESS ASSIGNMENT SYSTEM FOR EXTRACTING UNUSED ASSIGNMENT ADDRESSES FROM A COMMUNICATION FRAME CIRCULATING AMONG COMMUNICATION STATIONS

BACKGROUND OF THE INVENTION

1. Field of the Invention

The present invention relates to an address assignment method, for use in a communication system composed of a plurality of communication stations communicating with each other via a data transmission line, which is used to assign a unique address to each communication station to identify itself. In particular, the present invention relates to an address assignment method which allows each of a plurality of communication stations to assign a unique address to itself through an easy processing procedure and, at the same time, increases the throughput of the whole system at address assignment time. The present invention also relates to a communication system to which this address assignment method is applied.

In addition, the present invention relates to an address assignment method, for use in a communication system composed of a plurality of communication stations each with one or more child nodes and communicating with each other via a data transmission line, which is used to assign a unique address to each communication station and to each child node to identify themselves. In particular, the present invention relates to an address assignment method which allows each of a plurality of communication stations to assign a unique address to itself and to each of its child nodes through an easy processing procedure and, at the same time, increases the throughput of the whole system at address assignment time; the present invention also relates to a communication system to which this address assignment system is applied.

2. Description of the Related Art

Conventionally, a communication system composed of a plurality of communication stations connected with each other for communication via a data transmission line has been known.

To exchange data among communication stations in the conventional communication station described above, it is necessary to assign, in advance, an address to each communication station to identify itself.

Conventionally, an address assignment method, such as the one disclosed in Japanese Patent Laid-Open Publication No. Hei 4-326896, is known where at least one master station and a plurality of slave stations are connected to the same communication bus.

The communication system disclosed in the above publication has the following configuration. Each slave station comprises storage means for updating its own communication address and connection requesting means for sending its own connection request information to the master station at communication system startup. The master station comprises communication address assignment means for assigning a unique communication address, different from that of any other slave station, to a requesting slave station when it receives the above-mentioned connection request information and for informing the slave station of the assigned communication address.

In this communication system, the connection requesting means of each slave station sends its own connection request information to the master station during communication system startup. Upon receiving connection request information from a slave station, the address assignment means of the master station assigns a communication address, different from that of any other stave station, to the slave station and informs the slave station of the assigned communication address. Therefore, even if a plurality of slave stations are connected to the same communication bus, each slave station is assigned an address which uniquely identifies itself.

However, the address assignment method of the conventional communication system has the following problem. That is, upon receiving connection request information from each slave station, the master station assigns a communication address different from that of any other slave station and returns the assigned communication address to the slave station individually. This configuration makes the processing procedure complicated when data (such as connection request information, communication address, and so on) is exchanged between the master station and each of a plurality of slave stations.

Another problem is that the total period of time required for data to be exchanged, or the time required for address assignment, tends to become long. As a result, it is difficult to increase the throughput of the whole communication system at address assignment time.

SUMMARY OF THE INVENTION

In view of the foregoing, it is an object of the present invention to provide an address assignment method and a communication system, to which this address assignment method is applied, which allow each of a plurality of communication stations to assign a unique address to itself through a simple processing procedure and, at the same time, increase the throughput of the whole system at address assignment time.

It is another object of the present invention to provide an address assignment method and a communication system, to which this address assignment method is applied, which allow each of a plurality of communication stations to assign a unique address to itself and to each of their child nodes through a simple processing procedure and which increase the throughput of the whole system at address assignment time.

To achieve the above object, there is provided an address assignment method, for use in a communication system composed of a plurality of communication stations capable of exchanging data with each other via a data transmission line, for circulating a communication frame among the plurality of communication stations to assign an address to each of the plurality of communication stations so that each communication station may be identified, the communication frame comprising a destination address description area in which a destination address of a destination communication station to which the communication frame is sent is described; and an assignment address description area in which assignment addresses to be assigned to the plurality of communication stations are described, each of the plurality of communication stations comprising means for storing its own address, the address assignment method comprising the steps of storing a predetermined value into the means for storing its own address to set up the assignment of the address by a source communication station which is one of the plurality of communication stations and from which the communication frame is originated; storing a common temporary address value, other than the predetermined value, into the means for storing its own address to temporary assign the common temporary address to the address by the destination communication station; generating the communication frame whose destination address description area contains the common temporary address and whose assignment address description area contains the assignment addresses and sending the generated communication frame to the destination communication station by the source communication station; and when the destination address in the communication frame received via the data transmission line matches the address stored in the means for storing its own address of the station and when the assignment address description area of the communication frame contains at least one unused addresses, extracting one of the unused assignment addresses, generating the communication frame whose assignment address description area has been updated by extracting the assignment address, updating the address stored in the means for storing its own address with the extracted assignment address to set up the assignment of the address of the station, and sending the generated communication frame to the next communication station by the destination communication station.

According to the present invention, the source communication station stores a predetermined value into the means for storing its own address to set up the assignment of the address and the destination communication station stores a common temporary address value, other than the predetermined value, into the means for storing its own address to temporary assign the common temporary address to the address.

Then, the source communication station generates the communication frame whose destination address description area contains the common temporary address and whose assignment address description area contains the assignment addresses and sends the generated communication frame to the destination communication station.

When the destination address in the communication frame received via the data transmission line matches the address stored in the means for storing its own address of the station and when the assignment address description area of the communication frame contains at least one unused addresses, the destination communication station extracts one of the unused assignment addresses, generates the communication frame whose assignment address description area has been updated by extracting the assignment address, updates the address stored in the means for storing its own address with the extracted assignment address to set up the assignment of the address of the station, and sends the generated communication frame to the next communication station.

Thus, in accordance with the present invention, when a destination communication station receives a communication frame containing a destination address matching its own address and containing unused assignment addresses in the assignment address description area, it extracts one of unused assignment addresses, generates the communication frame whose assignment address description area has been updated by extracting the assignment address, and updates its own address stored in the means for storing its own address with the extracted assignment address to assigns the address to itself. The destination communication station then sends the generated communication frame to the next communication station so that the communication frame may circulate among a plurality of communication stations. This allows each of the plurality of communication stations to assign a unique address to itself through an easy procedure and, at the same time, increases the throughput of the whole system at address assignment time.

In a preferred embodiment of the present invention, when the destination address in the communication frame received via the data transmission line matches the address stored in the means for storing its own address of the station but when the assignment address description area of the communication frame does not contain unused addresses, the destination communication station sends the received communication frame unchanged to the next communication station without setting up the assignment of the address of the station.

In accordance with this embodiment, when the destination communication station receives the communication frame whose destination address matches the address of the station and whose assignment address description area does not contain unused assignment addresses, it sends the received communication frame unchanged to the next communication station without setting up the assignment of the address of the station.

In a preferred embodiment of the present invention, when the destination address in the communication frame received via the data transmission line matches the address stored in the means for storing its own address of the station but when the assignment address description area of the communication frame does not contain unused addresses, the destination communication station sends the received communication frame unchanged to the next communication station without setting up the assignment of the address of the station and, when the assignment address description area of the communication frame received via the data transmission line does not contain unused assignment addresses, the source communication station generates the communication frame whose destination address description area contains the temporary common address and whose assignment address description area contains updated assignment addresses and sends the generated communication frame to the destination communication station again.

In accordance with this embodiment, when the destination communication station receives the communication frame whose destination address matches the address of the station and whose assignment address description area does not contain unused assignment addresses, it sends the received communication frame unchanged to the next communication station without setting up the assignment of the address of the station.

On the other hand, when the source communication station receives the communication frame whose assignment address description area does not contain unused assignment addresses, the source communication station generates the communication frame whose destination address description area contains the temporary common address and whose assignment address description area contains updated assignment addresses and sends the generated communication frame to the destination communication station again.

To achieve the above object, there is provided an address assignment method, for use in a communication system composed of a plurality of communication stations capable of exchanging data with each other via a data transmission line, for circulating a communication frame among the plurality of communication stations to assign an address to each of the plurality of communication stations so that each communication station may be identified, the communication frame comprising a destination address description area in which a destination address of a destination communication station to which the communication frame is sent is described; an assignment address description area in which assignment addresses to be assigned to the plurality of communication stations are described, and an identification flag area which is provided for each of the assignment addresses and which contains an identification flag used to identify whether or not the assignment address is used, each of the plurality of communication stations comprising means for storing its own address, the address assignment method comprising the steps of storing a predetermined value into the means for storing its own address to set up the assignment of the address by a source communication station which is one of the plurality of communication stations and from which the communication frame is originated; storing a common temporary address value, other than the predetermined value, into the means for storing its own address to temporary assign the common temporary address to the address by the destination communication station; generating the communication frame whose destination address description area contains the common temporary address, whose assignment address description area contains the assignment addresses, and whose identification flag description areas each contain the identification flag indicating the assignment address is unused and sending the generated communication frame to the destination communication station by the source communication station; and when the destination address in the communication frame received via the data transmission line matches the address stored in the means for storing its own address of the station and when the assignment address description area of the communication frame contains at least one unused addresses, reading one of the unused assignment addresses, generating the communication frame whose identification flag description area corresponding to the assignment address that was read has been updated to the value indicating that the assignment address is used, updating the address stored in the means for storing its own address with the assignment address that was read to set up the assignment of the address of the station, and sending the generated communication frame to the next communication station by the destination communication station.

According to the present invention, the source communication station stores a predetermined value into the means for storing its own address to set up the assignment of the address and the destination communication station stores a common temporary address value, other than the predetermined value, into the means for storing its own address to temporary assign the common temporary address to the address.

Then, the source communication station generates the communication frame whose destination address description area contains the common temporary address, whose assignment address description area contains the assignment addresses, and whose identification flag description areas each contain the identification flag indicating the assignment address is unused and sends the generated communication frame to the destination communication station.

When the destination address in the communication frame received via the data transmission line matches the address stored in the means for storing its own address of the station and when the assignment address description area of the communication frame contains at least one unused addresses, the destination communication station reads one of the unused assignment addresses, generates the communication frame whose identification flag description area corresponding to the assignment address that was read has been updated to the value indicating that the assignment address is used, updates the address stored in the means for storing its own address with the assignment address that was read to set up the assignment of the address of the station, and sends the generated communication frame to the next communication station by the destination communication station.

Thus, in accordance with the present invention, when a destination communication station receives a communication frame containing the destination address matching its own address and containing unused assignment addresses in the assignment address description area, it reads one of unused assignment addresses, generates the communication frame whose assignment address description area has been updated by changing the identification flag corresponding to the assignment address that was read, and updates its own address stored in the means for storing its own address with the assignment address that was read. The destination communication station assigns its own address in this manner and sends the generated communication frame to the next communication station so that the communication frame may circulate among a plurality of communication stations. This allows each of the plurality of communication stations to assign a unique address to itself through an easy procedure and, at the same time, increases the throughput of the whole system at address assignment time.

In a preferred embodiment of the present invention, when the destination address in the communication frame received via the data transmission line matches the address stored in the means for storing its own address of the station but when the assignment address description area of the communication frame does not contain unused addresses, the destination communication station sends the received communication frame unchanged to the next communication station without setting up the assignment of the address of the station.

In accordance with this embodiment, when the destination communication station receives the communication frame whose destination address matches the address of the station and whose assignment address description area does not contain unused assignment addresses, it sends the received communication frame unchanged to the next communication station without setting up the assignment of the address of the station.

In a preferred embodiment of the present invention, when the destination address in the communication frame received via the data transmission line matches the address stored in the means for storing its own address of the station but when the assignment address description area of the communication frame does not contain unused addresses, the destination communication station sends the received communication frame unchanged to the next communication station without setting up the assignment of the address of the station and, when the assignment address description area of the communication frame received via the data transmission line does not contain unused assignment addresses, the source communication station generates the communication frame whose destination address description area contains the temporary common address, whose assignment address description area contains updated assignment addresses, and whose identification flag description areas each contain the identification flag indicating that the assignment address is unused and sends the generated communication frame to the destination communication station again.

In accordance with this embodiment, when the destination communication station receives the communication frame whose destination address matches the address of the station and whose assignment address description area does not contain unused assignment addresses, it sends the received communication frame unchanged to the next communication station without setting up the assignment of the address of the station.

On the other hand, when the source communication station receives the communication frame whose assignment address description area does not contain unused assignment addresses, the source communication station generates the communication frame whose destination address description area contains the temporary common address, whose assignment address description area contains updated assignment addresses, and whose identification flag description areas each contain the identification flag indicating that the assignment address is unused and sends the generated communication frame to the destination communication station again.

To achieve the above object, there is provided an address assignment method, for use in a communication system composed of a plurality of communication stations, to which child nodes are connected, capable of exchanging data with each other via a data transmission line, for circulating a communication frame among the plurality of communication stations to assign an address to each of the plurality of communication stations and the child nodes so that each communication station and child node may be identified, the communication frame comprising a destination address description area in which a destination address of a destination communication station to which the communication frame is sent is described; and an assignment address description area in which assignment addresses to be assigned to the plurality of communication stations are described, each of the plurality of communication stations comprising means for storing its own address and means for storing the addresses of child nodes connected to the station, the address assignment method comprising the steps of storing a predetermined value into the means for storing its own address to set up the assignment of the address by a source communication station which is one of the plurality of communication stations and from which the communication frame is originated; storing a common temporary address value, other than the predetermined value, into the means for storing its own address to temporary assign the common temporary address to the address by the destination communication station; generating the communication frame whose destination address description area contains the common temporary address and whose assignment address description area contains the assignment addresses and sending the generated communication frame to the destination communication station by the source communication station; and when the destination address in the communication frame received via the data transmission line matches the address stored in the means for storing its own address of the station and when the assignment address description area of the communication frame contains at least one unused addresses, extracting one of the unused assignment addresses, generating the communication frame whose assignment address description area has been updated by extracting the assignment address, storing child address values, obtained by performing a predetermined operation on the extracted assignment address, into the means for storing child addresses, updating the address stored in the means for storing its own address with the extracted assignment address to set up the assignment of the address of the station, sending the child addresses stored in the means for storing child addresses to the child nodes connected to the station to set up the assignment of the address of each of the child nodes, and sending the generated communication frame to the next communication station by the destination communication station.

According to the present invention, the source communication station stores a predetermined value into the means for storing its own address to set up the assignment of the address and the destination communication station stores a common temporary address value, other than the predetermined value, into the means for storing its own address to temporary assign the common temporary address to the address.

Then, the source communication station generates the communication frame whose destination address description area contains the common temporary address and whose assignment address description area contains the assignment addresses and sends the generated communication frame to the destination communication station.

When the destination address in the communication frame received via the data transmission line matches the address stored in the means for storing its own address of the station and when the assignment address description area of the communication frame contains at least one unused addresses, the destination communication station extracts one of the unused assignment addresses, generates the communication frame whose assignment address description area has been updated by extracting the assignment address, stores child address values, obtained by performing a predetermined operation on the extracted assignment address, into the means for storing child addresses, updates the address stored in the means for storing its own address with the extracted assignment address to set up the assignment of the address of the station, sends the child addresses stored in the means for storing child addresses to the child nodes connected to the station to set up the assignment of the address of each of the child nodes, and sends the generated communication frame to the next communication station by the destination communication station.

Thus, in accordance with the present invention, when a destination communication station receives a communication frame containing the destination address matching its own address and containing unused assignment addresses in the assignment address description area, it extracts one of unused assignment addresses and generates the communication frame whose assignment address description area has been updated by extracting the assignment address. The destination communication station stores the child address values, generated by performing a predetermined operation on the extracted assignment address, into the means for storing child addresses. It then assigns its own address by updating its own address stored in the means for storing its own address with the extracted address value and assigns the addresses of child nodes by sending the child addresses stored in the means for storing child addresses to the child nodes. The destination communication station sends the generated communication frame to the next communication station so that the communication frame may circulate among a plurality of communication stations. This allows each of the plurality of communication stations to assign a unique address to itself and the child nodes connected to it through an easy procedure and, at the same time, increases the throughput of the whole system at address assignment time.

In a preferred embodiment of the present invention, when the destination address in the communication frame received via the data transmission line matches the address stored in the means for storing its own address of the station and when the assignment address description area of the communication frame contains at least one unused addresses, the destination communication station extracts one of the unused assignment addresses, generates the communication frame whose assignment address description area has been updated by extracting the assignment address, stores a plurality of child address values sequentially into the means for storing child addresses by repeatedly performing the predetermined operation on the extracted assignment address, updates the address stored in the means for storing its own address with the extracted assignment address to set up the assignment of the address of the station, sends the child addresses stored in the means for storing child addresses to the child nodes connected to the station to set up the assignment of the address of each of the child nodes, and sends the generated communication frame to the next communication station.

In accordance with this embodiment, when a destination communication station receives a communication frame containing the destination address matching its own address and containing unused assignment addresses in the assignment address description area, it extracts one of unused assignment addresses and generates the communication frame whose assignment address description area has been updated by extracting the assignment address. The destination communication station stores the child address values, generated by performing a predetermined operation on the extracted assignment address, into the means for storing child addresses. And, it updates the address stored in the means for storing its own address with the extracted assignment address to set up the assignment of the address of the station, sends the child addresses stored in the means for storing child addresses to the child nodes connected to the station to set up the assignment of the address of each of the child nodes, and sends the generated communication frame to the next communication station.

In a preferred embodiment of the present invention, when a new child node is connected to the destination communication station, the destination communication station sends one of the plurality of child addresses stored in the means for storing child addresses to the newly-connected child node to set up the assignment of the address of the child node.

In accordance with this embodiment, when a new child node is connected to the destination communication station, it sends one of the plurality of child addresses to the newly-connected child to set up the assignment of the child address. This allows, at any time after system creation, a new child node to be added and, at the same time, to be identified as one of child nodes connected to the destination communication station. As a result, the address assignment method compatible with the plug-and-play function may be implemented.

To achieve the above object, there is provided an address assignment method, for use in a communication system composed of a plurality of communication stations, to which child nodes are connected, capable of exchanging data with each other via a data transmission line, for circulating a communication frame among the plurality of communication stations to assign an address to each of the plurality of communication stations and to the child nodes so that each communication station and child node may be identified, the communication frame comprising a destination address description area in which a destination address of a destination communication station to which the communication frame is sent is described; an assignment address description area in which assignment addresses to be assigned to the plurality of communication stations are described, and an identification flag area which is provided for each of the assignment addresses and which contains an identification flag used to identify whether or not the assignment address is used, each of the plurality of communication stations comprising means for storing its own address and means for storing the addresses of child nodes connected to the station, the address assignment method comprising the steps of storing a predetermined value into the means for storing its own address to set up the assignment of the address by a source communication station which is one of the plurality of communication stations and from which the communication frame is originated; storing a common temporary address value, other than the predetermined value, into the means for storing its own address to temporary assign the common temporary address to the address by the destination communication station; generating the communication frame whose destination address description area contains the common temporary address, whose assignment address description area contains the assignment addresses, and whose identification flag description areas each contain the identification flag indicating the assignment address is unused and sending the generated communication frame to the destination communication station by the source communication station; and when the destination address in the communication frame received via the data transmission line matches the address stored in the means for storing its own address of the station and when the assignment address description area of the communication frame contains at least one unused addresses, reading one of the unused assignment addresses, generating the communication frame whose identification flag description area corresponding to the assignment address that was read has been updated to the value indicating that the assignment address is used, storing child address values, obtained by performing a predetermined operation on the assignment address that was read, into the means for storing child addresses, updating the address stored in the means for storing its own address with the assignment address that was read to set up the assignment of the address of the station, sending the child addresses stored in the means for storing child addresses to the child nodes connected to the station to set up the assignment of the address of each of the child nodes, and sending the generated communication frame to the next communication station by the destination communication station.

According to the present invention, the source communication station stores a predetermined value into the means for storing its own address to set up the assignment of the address and the destination communication station stores a common temporary address value, other than the predetermined value, into the means for storing its own address to temporary assign the common temporary address to the address.

Then, the source communication station generates the communication frame whose destination address description area contains the common temporary address, whose assignment address description area contains the assignment addresses, and whose identification flag description areas each contain the identification flag indicating the assignment address is unused and sends the generated communication frame to the destination communication station.

When the destination address in the communication frame received via the data transmission line matches the address stored in the means for storing its own address of the station and when the assignment address description area of the communication frame contains at least one unused addresses, the destination communication station reads one of the unused assignment addresses, generates the communication frame whose identification flag description area corresponding to the assignment address that was read has been updated to the value indicating that the assignment address is used, stores child address values, obtained by performing a predetermined operation on the assignment address that was read, into the means for storing child addresses, updates the address stored in the means for storing its own address with the assignment address that was read to set up the assignment of the address of the station, sends the child addresses stored in the means for storing child addresses to the child nodes connected to the station to set up the assignment of the address of each of the child nodes, and sends the generated communication frame to the next communication station by the destination communication station.

Thus, in accordance with the present invention, when a destination communication station receives a communication frame containing the destination address matching its own address and containing unused assignment addresses in the assignment address description area, it reads one of unused assignment addresses and generates the communication frame whose assignment address description area has been updated by changing the identification flag to the used status. The destination communication station then stores the child address values, generated by performing a predetermined operation on the assignment address that was read, into the means for storing child addresses. It then assigns its own address by updating its own address stored in the means for storing its own address with the address value that was read and assigns the address of child nodes, connected to the destination communication station, by sending the child addresses stored in the means for storing child addresses to the child nodes. The destination communication station sends the generated communication frame to the next communication station so that the communication frame may circulate among a plurality of communication stations. This allows each of the plurality of communication stations to assign a unique address to itself and the child nodes connected to the station through an easy procedure and, at the same time, increases the throughput of the whole system at address assignment time.

In a preferred embodiment of the present invention, when the destination address in the communication frame received via the data transmission line matches the address stored in the means for storing its own address of the station and when the assignment address description area of the communication frame contains at least one unused addresses, the destination communication station reads one of the unused assignment addresses, generates the communication frame whose identification flag description area corresponding to the assignment address that was read has been updated to the value indicating that the assignment address is used, stores a plurality of child address values sequentially into the means for storing child addresses by repeatedly performing a predetermined operation on the assignment address that was read, updates the address stored in the means for storing its own address with the assignment address that was read to set up the assignment of the address of the station, sends the plurality of child addresses stored in the means for storing child addresses to the child nodes connected to the station to set up the assignment of the address of each of the child nodes, and sends the generated communication frame to the next communication station.

In accordance with this embodiment, when a destination communication station receives a communication frame containing the destination address matching its own address and containing unused assignment addresses in the assignment address description area, it reads one of unused assignment addresses and generates the communication frame whose assignment address description area has been updated by changing the identification flag to the value indicating that the address is used. It then stores a plurality of child address values sequentially into the means for storing child addresses by repeatedly performing a predetermined operation on the assignment address that was read, updates the address stored in the means for storing its own address with the assignment address that was read to set up the assignment of the address of the station, sends the plurality of child addresses stored in the means for storing child addresses to the child nodes connected to the station to set up the assignment of the address of each of the child nodes, and sends the generated communication frame to the next communication station.

In a preferred embodiment of the present invention, when a new child node is connected to the destination communication station, the destination communication station sends one of the plurality of child addresses stored in the means for storing child addresses to the newly-connected child node to set up the assignment of the address of the child node.

In accordance with this embodiment, when a new child node is connected to the destination communication station, it sends one of the plurality of child addresses to the newly-connected child to set up the assignment of the child address. This allows, at any time after system creation, a new child node to be added and, at the same time, to be identified as one of child nodes connected to the destination communication station. As a result, the address assignment method compatible with the plug-and-play function may be implemented.

To achieve the above object, there is provided a communication system which is composed of a plurality of communication stations capable of exchanging data with each other via a data transmission line and to which an address assignment method for circulating a communication frame among the plurality of communication stations to assign an address to each of the plurality of communication stations so that each communication station may be identified is applied, the communication frame comprising a destination address description area in which a destination address of a destination communication station to which the communication frame is sent is described; and an assignment address description area in which assignment addresses to be assigned to the plurality of communication stations are described, each of the plurality of communication stations comprising means for storing its own address, the communication system comprising a source communication station which is one of the plurality of communication stations and from which the communication frame is originated, comprising source address assignment means for setting up the assignment of a source address by storing a predetermined value into the means for storing its own address; source communication frame generation means for generating the communication frame whose destination address description area contains a common temporary address value, other than the predetermined value, and whose assignment address description area contains the assignment addresses; and source communication frame sending means for sending the communication frame from the source communication frame generation means to the destination communication station, and the destination communication station comprising: temporary address assignment means for temporarily assigning the common temporary address to its own address by storing the common temporary address in the means for storing its own address; assignment address extraction means for extracting one of unused assignment addresses when the destination address in the communication frame received via the data transmission line matches the address stored in the means for storing its own address of the station and when the assignment address description area of the communication frame contains at least one unused addresses; destination communication frame generation means for generating the communication frame whose assignment address description area has been updated by extracting the assignment address; destination address assignment means for updating the address stored in the means for storing its own address with the extracted assignment address to set up the assignment of the address of the station; and destination communication frame sending means for sending the communication frame sent from the destination communication frame generation means to the next communication station.

According to the present invention, the source address assignment means of the source communication station stores a predetermined value into the means for storing its own address to set up the assignment of the address and the temporary address assignment means of the destination communication station stores a common temporary address value, other than the predetermined value, into the means for storing its own address to temporary assign the common temporary address to the address.

Then, the source communication frame generation means of the source communication station generates the communication frame whose destination address description area contains the temporary common address and whose assignment address description area contains assignment addresses and the source communication frame sending means sends the communication frame sent from the source communication frame generation means to the destination communication station again.

In the destination communication station, assignment address extraction means extracts one of unused assignment addresses when the destination address in the communication frame received via the data transmission line matches the address stored in the means for storing its own address of the station and when the assignment address description area of the communication frame contains at least one unused addresses; destination communication frame generation means generates the communication frame whose assignment address description area has been updated by extracting the assignment address; destination address assignment means updates the address stored in the means for storing its own address with the extracted assignment address to set up the assignment of the address of the station; and destination communication frame sending means sends the communication frame sent from the destination communication frame generation means to the next communication station.

Thus, in accordance with the present invention, when a destination communication station receives a communication frame containing a destination address matching its own address and containing unused assignment addresses in the assignment address description area, it extracts one of unused assignment addresses, generates the communication frame whose assignment address description area has been updated by extracting the assignment address, and updates its own address stored in the means for storing its own address with the extracted assignment address to set up the address of the station. The communication station then sends the generated communication frame to the next communication station so that the communication frame may circulate among a plurality of communication stations. This allows each of the plurality of communication stations to assign a unique address to itself through an easy procedure and, at the same time, increases the throughput of the whole system at address assignment time.

In a preferred embodiment of the present invention, when the destination address in the communication frame received via the data transmission line matches the address stored in the means for storing its own address of the station but when the assignment address description area of the communication frame does not contain unused addresses, the destination communication frame generation means sends the received communication frame unchanged to the next communication station without setting up the assignment of the address of the station.

In accordance with this embodiment, when the destination address in the communication frame received via the data transmission line matches the address stored in the means for storing its own address of the station but when the assignment address description area of the communication frame does not contain unused addresses, the destination communication frame generation means sends the received communication frame unchanged to the next communication station without setting up the assignment of the address of the station.

In a preferred embodiment of the present invention, when the assignment address description area of the communication frame received via the data transmission line does not contain unused assignment addresses, the source communication frame generation means generates the communication frame whose destination address description area contains the temporary common address and whose assignment address description area contains updated assignment addresses and the source communication frame sending means sends the communication frame sent from the source communication frame generation means to the destination communication station again.

In accordance with this embodiment, when the source communication frame generation means receives the communication frame whose destination address matches the address of the station and whose assignment address description area does not contain unused assignment addresses, source communication frame generation means generates the communication frame whose destination address description area contains the temporary common address and whose assignment address description area contains updated assignment addresses and the source communication frame sending means sends the communication frame sent from the source communication frame generation means to the destination communication station again.

To achieve the above object, there is provided a communication system which is composed of a plurality of communication stations capable of exchanging data with each other via a data transmission line and to which an address assignment method for circulating a communication frame among the plurality of communication stations to assign an address to each of the plurality of communication stations so that each communication station may be identified is applied, the communication frame comprising a destination address description area in which a destination address of a destination communication station to which the communication frame is sent is described; an assignment address description area in which assignment addresses to be assigned to the plurality of communication stations are described; and an identification flag description area which is provided for each of the assignment addresses and which contains an identification flag used to identify whether or not the assignment address is used, each of the plurality of communication stations comprising means for storing its own address, the communication system comprising a source communication station which is one of the plurality of communication stations and from which the communication frame is originated, comprising source address assignment means for storing a predetermined value into the means for storing its own address to set up the assignment of a source address; source communication frame generation means for generating the communication frame whose destination address description area contains a common temporary address value, other than the predetermined value, whose assignment address description area contains the assignment addresses, and whose identification flag description area contains identification flags each indicating that the assignment address is unused; and source communication frame sending means for sending the communication frame from the source communication frame generation means to the destination communication station, and the destination communication station comprising temporary address assignment means for temporarily assigning the common temporary address to its own address by storing the common temporary address in the means for storing its own address; assignment address value reading means for reading one of unused assignment addresses when the destination address in the communication frame received via the data transmission line matches the address stored in the means for storing its own address of the station and when the assignment address description area of the communication frame contains at least one unused addresses; destination communication frame generation means for generating the communication frame whose identification flag description area has been updated by changing the flag corresponding to the assignment address that was read by the assignment address value reading means to the value indicating that the assignment address is used; destination address assignment means for updating the address stored in the means for storing its own address with the assignment address read by the assignment address value reading means to set up the assignment of the address of the station; and destination communication frame sending means for sending the communication frame sent from the destination communication frame generation means to the next communication station.

According to the present invention, the source address assignment means of the source communication station stores a predetermined value into the means for storing its own address to set up the assignment of the address and the temporary address assignment means of the destination communication station stores a common temporary address value, other than the predetermined value, into the means for storing its own address to temporary assign the common temporary address to the address.

Then, in the source communication station, the source communication frame generation means generates the communication frame whose destination address description area contains the temporary common address, whose assignment address description area contains assignment addresses, and whose identification flag description area contains identification flags each indicating that the assignment address is unused and the source communication frame sending means sends the communication frame sent from the source communication frame generation means to the destination communication station again.

In the destination communication station, the assignment address value reading means reads one of unused assignment addresses when the destination address in the communication frame received via the data transmission line matches the address stored in the means for storing its own address of the station and when the assignment address description area of the communication frame contains at least one unused addresses; destination communication frame generation means generates the communication frame whose identification flag description area has been updated by changing the flag corresponding to the assignment address that was read by the assignment address value reading means to the value indicating that the assignment address is used; destination address assignment means updates the address stored in the means for storing its own address with the assignment address read by the assignment address value reading means to set up the assignment of the address of the station; and destination communication frame sending means sends the communication frame sent from the destination communication frame generation means to the next communication station.

Thus, in accordance with the present invention, when a destination communication station receives a communication frame containing the destination address matching its own address and containing unused assignment addresses in the assignment address description area, it reads one of unused assignment addresses, generates the communication frame whose assignment address description area has been updated by changing the identification flag corresponding to the assignment address that was read, and updates its own address stored in the means for storing its own address with the assignment address that was read. The destination communication station assigns its own address in this manner and sends the generated communication frame to the next communication station so that the communication frame may circulate among a plurality of communication stations. This allows each of the plurality of communication stations to assign a unique address to itself through an easy procedure and, at the same time, increases the throughput of the whole system at address assignment time.

In a preferred embodiment of the present invention, when the destination address in the communication frame received via the data transmission line matches the address stored in the means for storing its own address of the station but when the assignment address description area of the communication frame does not contain unused addresses, the destination communication frame generation means sends the received communication frame unchanged to the next communication station without updating the received communication frame.

In accordance with this embodiment, when the destination address in the communication frame received via the data transmission line matches the address stored in the means for storing its own address of the station but when the assignment address description area of the communication frame does not contain unused addresses, the destination communication frame generation means sends the received communication frame unchanged to the next communication station without updating the received communication frame.

In a preferred embodiment of the present invention, when the assignment address description area of the communication frame received via the data transmission line does not contain unused assignment addresses, the source communication frame generation means generates the communication frame whose destination address description area contains the temporary common address, whose assignment address description area contains updated assignment addresses, and whose identification flag description area contains identification flags each indicating that the assignment address is unused and the source communication frame sending means sends the communication frame sent from the source communication frame generation means to the destination communication station again.

In accordance with this embodiment, when the assignment address description area of the communication frame received via the data transmission line does not contain unused assignment addresses, the source communication frame generation means generates the communication frame whose destination address description area contains the temporary common address, whose assignment address description area contains updated assignment addresses, and whose identification flag description area contains identification flags each indicating that the assignment address is unused and the source communication frame sending means sends the communication frame sent from the source communication frame generation means to the destination communication station again.

To achieve the above object, there is provided a communication system which is composed of a plurality of communication stations, to which child nodes are connected, capable of exchanging data with each other via a data transmission line and to which an address assignment method for circulating a communication frame among the plurality of communication stations to assign an address to each of the plurality of communication stations and the child nodes so that each communication station may be identified is applied, the communication frame comprising a destination address description area in which a destination address of a destination communication station to which the communication frame is sent is described; and an assignment address description area in which assignment addresses to be assigned to the plurality of communication stations are described, each of the plurality of communication stations comprising means for storing its own address and means for storing the addresses of child nodes connected to the station, the communication system comprising a source communication station which is one of the plurality of communication stations and from which the communication frame is originated, comprising source address assignment means for storing a predetermined value into the means for storing its own address to set up the assignment of a source address; source communication frame generation means for generating the communication frame whose destination address description area contains a common temporary address value, other than the predetermined value, and whose assignment address description area contains the assignment addresses; and source communication frame sending means for sending the communication frame from the source communication frame generation means to the destination communication station, and the destination communication station comprising temporary address assignment means for temporarily assigning the common temporary address to its own address by storing the common temporary address in the means for storing its own address; assignment address value extraction means for extracting one of unused assignment addresses when the destination address in the communication frame received via the data transmission line matches the address stored in the means for storing its own address of the station and when the assignment address description area of the communication frame contains at least one unused addresses; operation control means for storing child address values, obtained by performing a predetermined operation on the assignment address value extracted by the assignment address value extraction means, into the child address storing means; destination communication frame generation means for generating the communication frame whose assignment address description area has been updated by extracting the assignment address by the assignment address value extraction means; destination address assignment means for updating the address stored in the means for storing its own address with the extracted assignment address to set up the assignment of the address of the station; child address assignment means for sending the child addresses, stored in the means for storing child addresses, to the child nodes connected to the station to set up the assignment of child node addresses; and destination communication frame sending means for sending the communication frame sent from the destination communication frame generation means to the next communication station.

In accordance with the present invention, the source address assignment means of the source communication station stores a predetermined value into the means for storing its own address to set up the assignment of the address and the temporary address assignment means of the destination communication station stores a common temporary address value, other than the predetermined value, into the means for storing its own address to temporary assign the common temporary address to the address.

Then, the source communication frame generation means of the source communication station generates the communication frame whose destination address description area contains the temporary common address and whose assignment address description area contains assignment addresses and the source communication frame sending means sends the communication frame sent from the source communication frame generation means to the destination communication station.

In the destination communication station, assignment address extraction means extracts one of unused assignment addresses when the destination address in the communication frame received via the data transmission line matches the address stored in the means for storing its own address of the station and when the assignment address description area of the communication frame contains at least one unused addresses. Destination communication frame generation means generates the communication frame whose assignment address description area has been updated by extracting the assignment address. Operation control means stores child address values, obtained by performing a predetermined operation on the assignment address value extracted by the assignment address value extraction means, into the child address storing means. Destination address assignment means updates the address stored in the means for storing its own address with the extracted assignment address to set up the assignment of the address of the station, and child address assignment means sends the child addresses, stored in the means for storing child addresses, to the child nodes connected to the station to set up the assignment of child node addresses. And, destination communication frame sending means sends the communication frame sent from the destination communication frame generation means to the next communication station.

Thus, in accordance with the present invention, when a destination communication station receives a communication frame containing the destination address matching its own address and containing unused assignment addresses in the assignment address description area, it extracts one of unused assignment addresses and generates the communication frame whose assignment address description area has been updated by extracting the assignment address. The destination communication station stores the child address values, generated by performing a predetermined operation on the extracted assignment address, into the means for storing child addresses. It then assigns its own address by updating its own address stored in the means for storing its own address with the extracted address value and assigns the addresses of child nodes by sending the child addresses stored in the means for storing child addresses to the child nodes connected to the station. The destination communication station sends the generated communication frame to the next communication station so that the communication frame may circulate among a plurality of communication stations. This allows each of the plurality of communication stations to assign a unique address to itself and the child nodes connected to it through an easy procedure and, at the same time, increases the throughput of the whole system at address assignment time.

In a preferred embodiment of the present invention, the operation control means sequentially stores a plurality of child address values, obtained by repeatedly performing the predetermined operation on the assignment address value extracted by the assignment address value extraction means, into the means for storing child addresses and the child address assignment means sends the plurality of child addresses, stored in the means for storing child addresses, to the child nodes connected to the station to set up the assignment of each child node.

In accordance with this embodiment, the operation control means sequentially stores a plurality of child address values, obtained by repeatedly performing the predetermined operation on the assignment address value extracted by the assignment address value extraction means, into the means for storing child addresses and the child address assignment means sends the plurality of child addresses, stored in the means for storing child addresses, to the child nodes connected to the station to set up the assignment of each child node.

In a preferred embodiment of the present invention, when a new child node is connected to the destination communication station, the child address assignment means sends one of the plurality of child addresses stored in the means for storing child addresses to the newly-connected child to set up the assignment of the address of the child node.

In accordance with this embodiment, when a new child node is connected to a destination communication station, it sends one of the plurality of child addresses to the newly-connected child to set up the assignment of the child address. This allows, at any time after system creation, a new child node to be added and, at the same time, to be identified as one of child nodes connected to the destination communication station. As a result, the communication system compatible with the plug-and-play function may be implemented.

To achieve the above object, there is provided a communication system which is composed of a plurality of communication stations, to which child nodes are connected, capable of exchanging data with each other via a data transmission line and to which an address assignment method for circulating a communication frame among the plurality of communication stations to assign an address to each of the plurality of communication stations and the child nodes so that each communication station may be identified is applied, the communication frame comprising a destination address description area in which a destination address of a destination communication station to which the communication frame is sent is described; an assignment address description area in which assignment addresses to be assigned to the plurality of communication stations are described, and an identification description flag area which is provided for each of the assignment addresses and which contains an identification flag used to identify whether or not the assignment address is used, each of the plurality of communication stations comprising means for storing its own address and means for storing the addresses of child nodes connected to the station, the communication system comprising a source communication station which is one of the plurality of communication stations and from which the communication frame is originated, comprising source address assignment means for storing a predetermined value into the means for storing its own address to set up the assignment of a source address; source communication frame generation means for generating the communication frame whose destination address description area contains a common temporary address value, other than the predetermined value, whose assignment address description area contains the assignment addresses, and whose identification flag description areas each contain the identification flag indicating the assignment address is unused; and source communication frame sending means for sending the communication frame from the source communication frame generation means to the destination communication station, and the destination communication station comprising temporary address assignment means for temporarily assigning the common temporary address to its own address by storing the common temporary address in the means for storing its own address; assignment address value reading means for reading one of unused assignment addresses when the destination address in the communication frame received via the data transmission line matches the address stored in the means for storing its own address of the station and when the assignment address description area of the communication frame contains at least one unused addresses; operation control means for storing child address values, obtained by performing a predetermined operation on the assignment address value read by the assignment address value reading means, into the child address storing means; destination communication frame generation means for generating the communication frame whose identification flag description area corresponding to the assignment address that was read by the assignment address value reading means has been updated to the value indicating that the assignment address is used, destination address assignment means for updating the address stored in the means for storing its own address with the assignment address that was read by the assignment address value reading means to set up the assignment of the address of the station; child address assignment means for sending the child addresses, stored in the means for storing child addresses, to the child nodes connected to the station to set up the assignment of child node addresses; and destination communication frame sending means for sending the communication frame sent from the destination communication frame generation means to the next communication station.

In accordance with the present invention, the source address assignment means of the source communication station stores a predetermined value into the means for storing its own address to set up the assignment of the address and the temporary address assignment means of the destination communication station stores a common temporary address value, other than the predetermined value, into the means for storing its own address to temporary assign the common temporary address to the address.

Then, in the source communication station, the source communication frame generation means generates the communication frame whose destination address description area contains the temporary common address, whose assignment address description area contains assignment addresses, and whose identification flag description area contains identification flags each indicating that the assignment address is unused and the source communication frame sending means sends the communication frame sent from the source communication frame generation means to the destination communication station.

In the destination communication station, the assignment address value reading means reads one of unused assignment addresses when the destination address in the communication frame received via the data transmission line matches the address stored in the means for storing its own address of the station and when the assignment address description area of the communication frame contains at least one unused addresses. Destination communication frame generation means generates the communication frame whose identification flag description area has been updated by changing the flag corresponding to the assignment address that was read by the assignment address value reading means to the value indicating that the assignment address is used. Operation control means stores child address values, obtained by performing a predetermined operation on the assignment address value read by the assignment address value reading means, into the child address storing means. Destination address assignment means updates the address stored in the means for storing its own address with the assignment address read by the assignment address value reading means to set up the assignment of the address of the station. Child address assignment means sends the child addresses, stored in the means for storing child addresses, to the child nodes connected to the station to set up the assignment of child node addresses. And, destination communication frame sending means sends the communication frame sent from the destination communication frame generation means to the next communication station.

Thus, in accordance with the present invention, when a destination communication station receives a communication frame containing the destination address matching its own address and containing unused assignment addresses in the assignment address description area, it reads one of unused assignment addresses and generates the communication frame whose assignment address description area has been updated by changing the identification flag to the used status. The destination communication station then stores the child address values, generated by performing a predetermined operation on the assignment address that was read, into the means for storing child addresses. It then assigns its own address by updating its own address stored in the means for storing its own address with the address value that was read and assigns the addresses of child nodes, connected to the destination communication station, by sending the child addresses stored in the means for storing child addresses to the child nodes. The destination communication station sends the generated communication frame to the next communication station so that the communication frame may circulate among a plurality of communication stations. This allows each of the plurality of communication stations to assign a unique address to itself and the child nodes connected to the station through an easy procedure and, at the same time, increases the throughput of the whole system at address assignment time.

In a preferred embodiment of the present invention, the operation control means sequentially stores a plurality of child address values, obtained by repeatedly performing the predetermined operation on the assignment address value extracted by the assignment address value extraction means, into the means for storing child addresses and the child address assignment means sends the plurality of child addresses, stored in the means for storing child addresses, to the child nodes connected to the station to set up the assignment of each child node.

In accordance with this embodiment, the operation control means sequentially stores a plurality of child address values, obtained by repeatedly performing the predetermined operation on the assignment address value extracted by the assignment address value extraction means, into the means for storing child addresses and the child address assignment means sends the plurality of child addresses, stored in the means for storing child addresses, to the child nodes connected to the station to set up the assignment of each child node.

In a preferred embodiment of the present invention, when a new child node is connected to the destination communication station, the child address assignment means sends one of the plurality of child addresses stored in the means for storing child addresses to the newly-connected child node to set up the assignment of the address of the child node.

In accordance with this embodiment, when a new child node is connected to the destination communication station, the child address assignment means sends one of the plurality of child addresses stored in the means for storing child addresses to the newly-connected child node to set up the assignment of the address of the child node. This allows, at any time after system creation, a new child node to be added and, at the same time, to be identified as one of child nodes connected to the destination communication station. As a result, the communication system compatible with the plug-and-play function may be implemented.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a diagram showing the format of a communication frame used in a communication system to which the address assignment method according to the second embodiment of the present invention is applied;

DESCRIPTION OF THE PREFERRED EMBODIMENTS

Referring to the attached drawings, some embodiments of an address assignment method and a communication system to which this address assignment method is applied are described below in detail.

Figure 1:
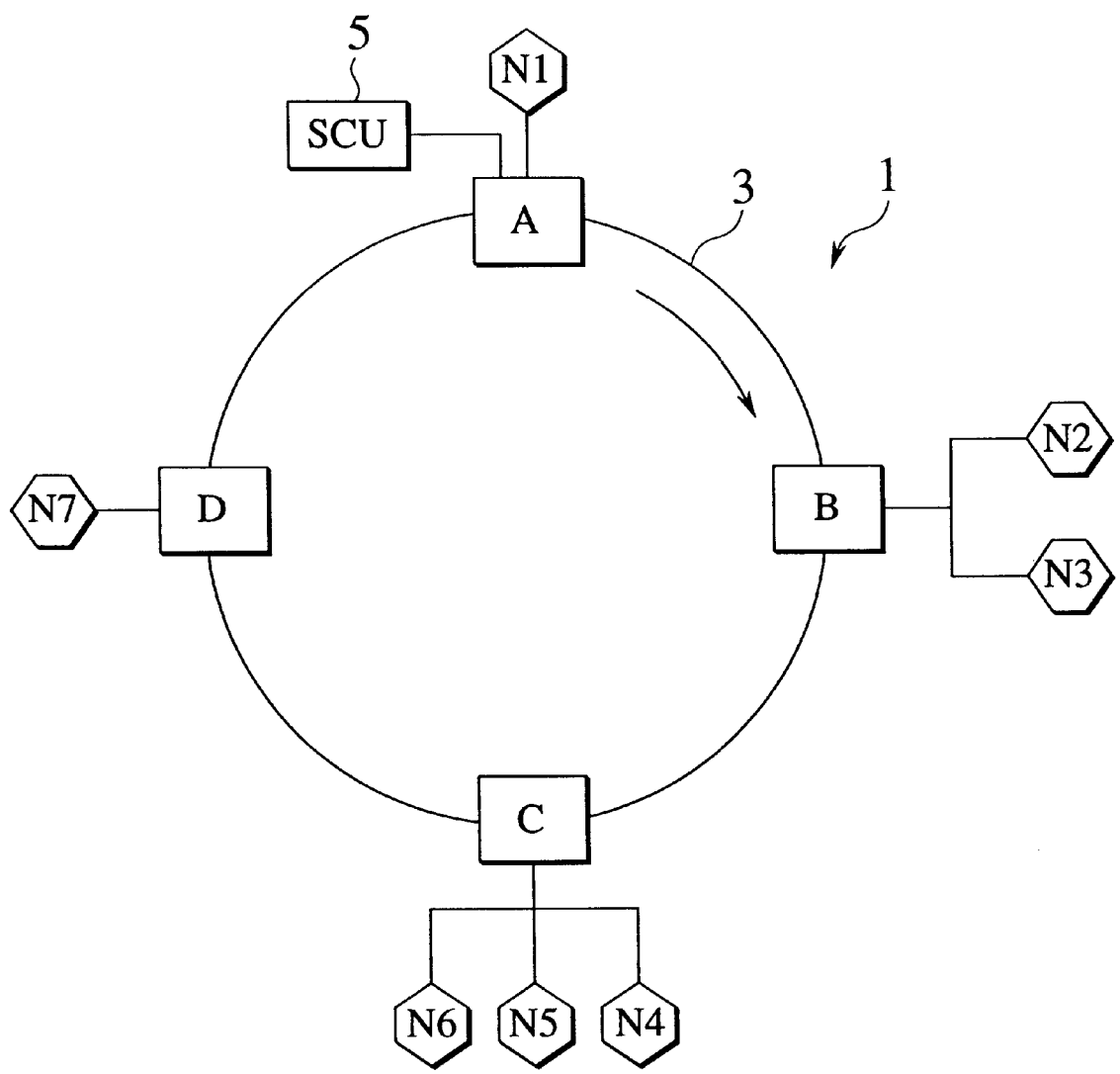
FIG. 1 is an overall block diagram showing a communication system commonly used by the first embodiment to the third embodiment of the present invention.

As shown in FIG. 1, a communication system 1 commonly used by the first to third embodiments of the present invention has a plurality of communication stations, A, B, C, and D, connected via a data transmission line 3 in a ring form so that they can exchange data with each other. To communication station A is connected a system control unit 5 (hereafter called an SCU). This system control unit 5 performs synchronization control of the whole communication system 1 and integrally manages the address assignment of the communication stations of the communication system 1 and the functional units N which will be described below. The network topology of the communication system 1 may not always be a ring topology. It may be a bus topology or a star topology.

One or more functional units N1 to N7 are connected to each of the plurality of communication stations. Data may be exchanged, via the data transmission line 3, between communication stations, between functional units N, and between a functional unit N and a communication station. When the communication system 1 according to the present invention is applied to a car, the functional unit N may include the following units: a mobile telephone, a facsimile (FAX), a digital TV, a radio receiver, a navigation unit(NV), a DVD(Digital Video Disc or Digital Versatile Disc)-ROM drive, a CD(Compact Disc)-ROM drive, a DAT(Digital Audio Tape recorder), an MD(Mini Disc), an audio-amplifier containing a digital signal processor(DSP), a CAN (Controller Area Network) interface, sensors such as an orientation sensor and a speed sensor, a monitor, and an on-board personal computer.

Figure 5A:
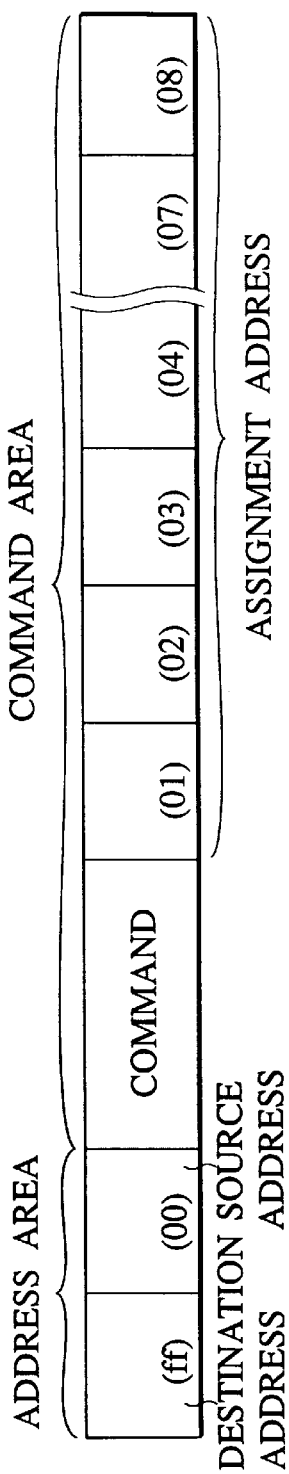
FIG. 5 is a diagram showing the format of a communication frame used in a communication system to which the address assignment method according to the first embodiment of the present invention is applied.

The format of a communication frame that circulates around the communication system 1, to which the address assignment method according to the first embodiment of the present invention is applied, is described with reference to FIG. 5A. A communication frame is composed of a plurality of information description areas in which various types of information are described. It is divided roughly into two types of area: an address area and a command area. The address area is composed of a destination address description area in which the destination address of the communication frame is described and a source address description area in which the source address of the communication frame is described. The command area is composed of a command description area in which various instructions and control information are described and an assignment address description area in which addresses to be assigned to communication stations are described.

The number of addresses that are described in the description area is set to an appropriate number (for example, 8), considering the number of communication stations which are to be used as the components of the communication system.

Although the assignment address description area is at the end of the communication frame in this example, the assignment address description area may be positioned anywhere within the communication frame.

Next, the block configuration of the internal of each communication station is described with reference to FIG. 2 with communication station B as an example. The communication station performs the major function in the communication system 1 commonly used in the first to third embodiments of the present invention.

Figure 2:
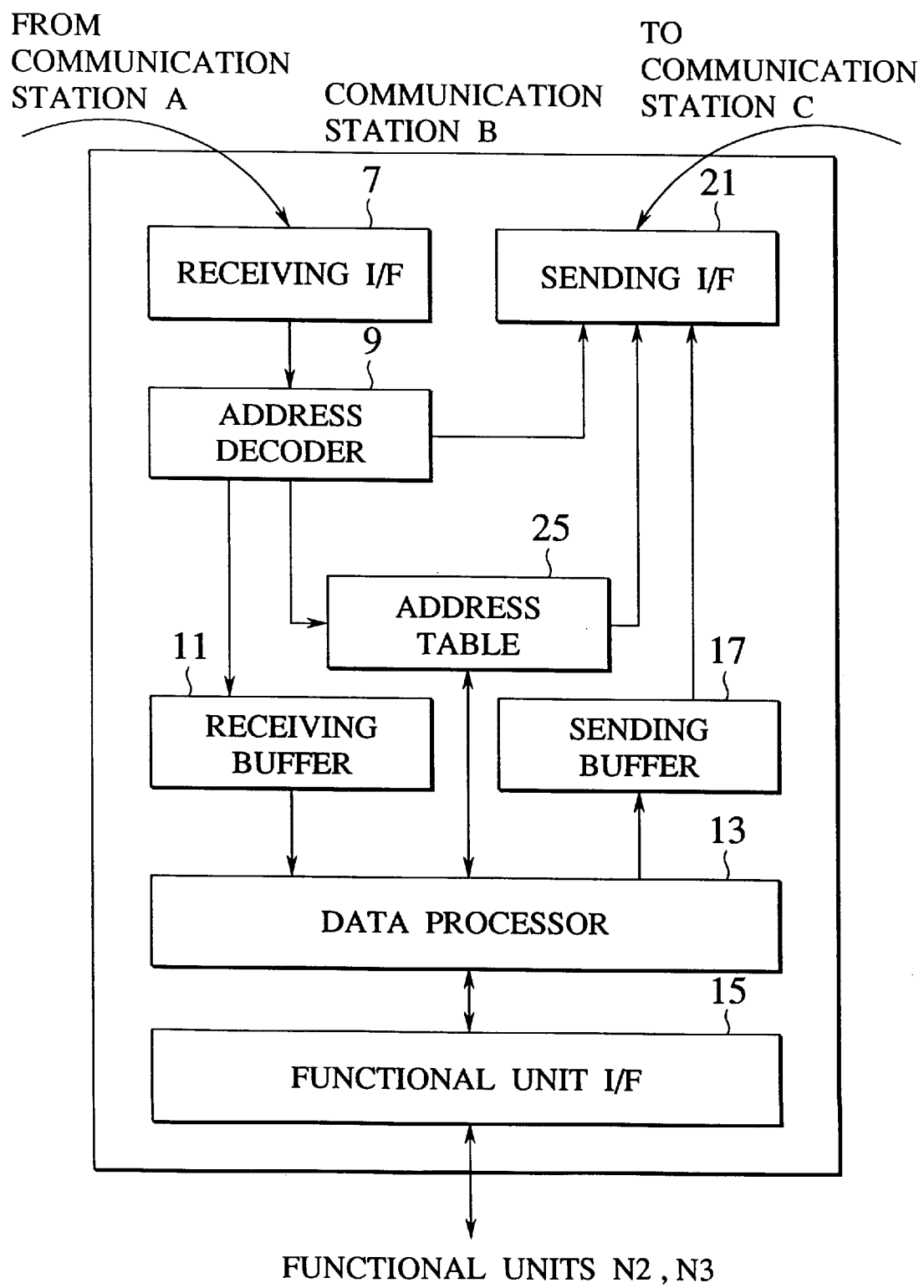
FIG. 2 is a block diagram showing a communication station which is the major part of the present invention.

As shown in FIG. 2, communication station B comprises a receiving interface (hereafter, an interface is abbreviated to I/F)7, an address decoder 9, an address table 25, a receiving buffer 11, a data processor 13, a functional unit I/F 15, a sending buffer 17, and a sending I/F 21. The receiving I/F 7 receives a communication frame from communication station A, which is an upstream station, via the data transmission line 3 configured in the ring form. The address decoder 9 decodes the destination address and the source address described in the address area in a communication frame received via the receiving I/F 7, checks if the decoded destination address matches the address of communication station B stored in the address table 25 which will be described below, selectively determines the routing path according to the determination result, and sends the communication frame to the determined routing path. The address table 25 contains the address of communication station B and the addresses of functional units N2 and N3 connected to communication station B. The receiving buffer 11 temporarily stores the communication frame sent from the address decoder 9. The data processor 13 performs conversion processing on control data sent from the functional unit(s) N, various types of data including source data, and the communication frame read from the receiving buffer 11. The functional unit I/F 15, to which functional units N2 and N3 are connected, performs conversion on various types of data sent from functional units N2 and N3, sends converted data to the data processor 13, performs conversion on the communication frame sent from the data processor 13, and selectively sends the converted communication frame to functional units N2 and N3. The sending buffer 17 temporarily stores various types of data converted by the data processor 13. The sending I/F 21 sends the communication frame, whose description contents in the assignment address description area has been updated, to communication station C, which is a downstream station, via the data transmission line 3.

Figure 3:
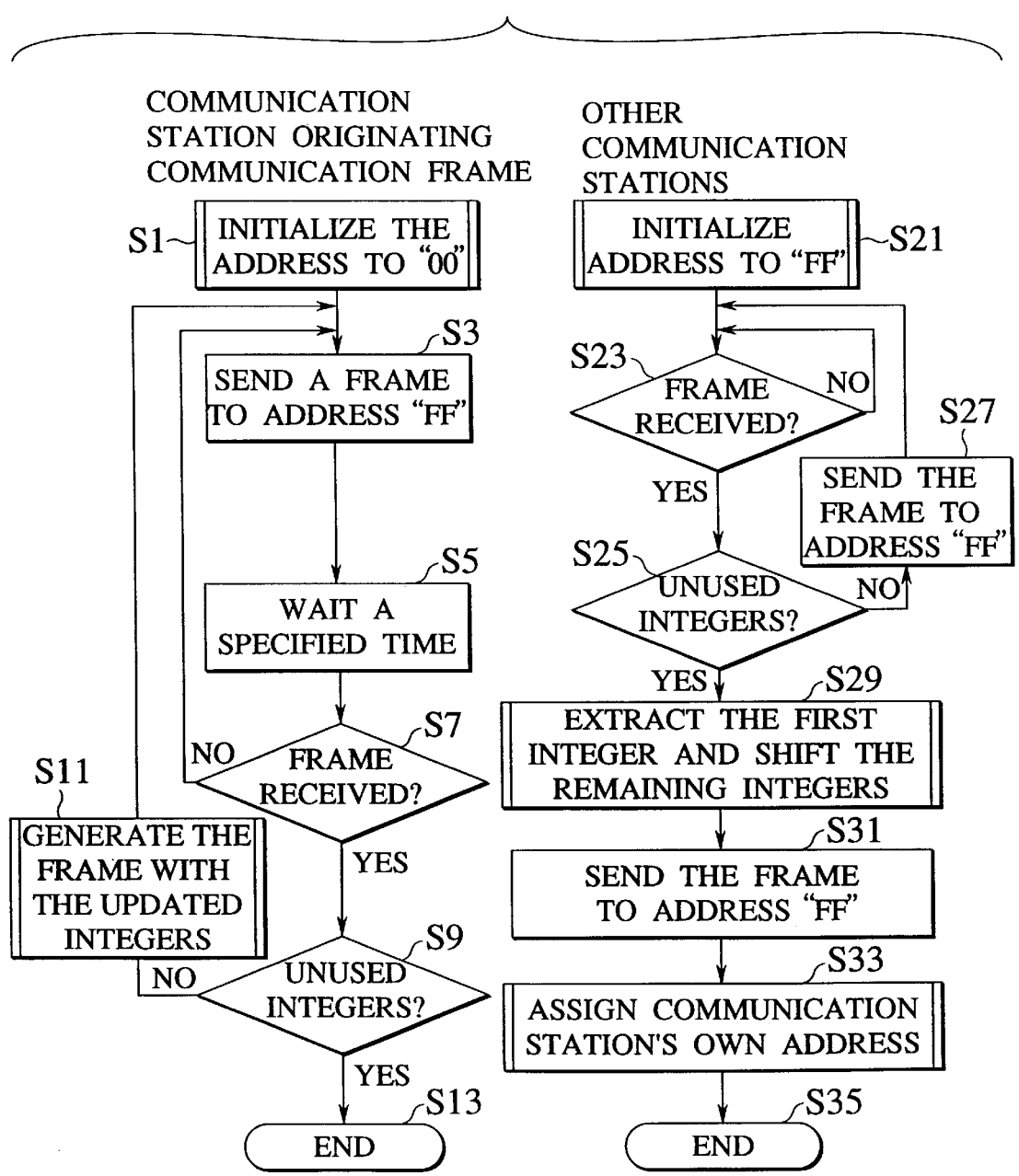
FIG. 3 is a flowchart showing a processing procedure for the address assignment method used in the first embodiment of the present invention.

Next, the address assignment method according to the first embodiment of the present invention is described using an example in which the communication frame is sent from the source station (communication station A) to the destination communication stations other than communication station A(that is, communication stations B, C, and D). FIG. 3 shows two processing flows: the processing flow of source communication station A and the processing flow of destination communication stations B, C, and D.

First, the processing flow of source communication station A is described. Before initializing the address of each communication station, source communication station A assigns the address of "00" to itself (step S1).

Next, the sending I/F 21 of source communication station A sends the communication frame, whose assignment address description area contains a plurality of assignment addresses to be assigned to the destination communication stations, to communication station B which is the downstream communication station of communication station A. At this time, it should be remembered that the temporary address of "ff" is temporarily assigned to each of the destination communication stations in advance (step S3).

After a predetermined period of time after sending the communication frame, the receiving I/F 7 of source communication station A checks if the communication frame is received, via the data transmission line 3, from communication station D which is the upstream communication station (steps S5 to S7).

Source communication station A repeats step S3 to step S7 until it receives the communication frame. Upon receiving the communication frame, it checks if the assignment address description area of the communication frame contains one or more unused integers(step S9). Note that an integer is an example of an assignment address.

Figure 5B:
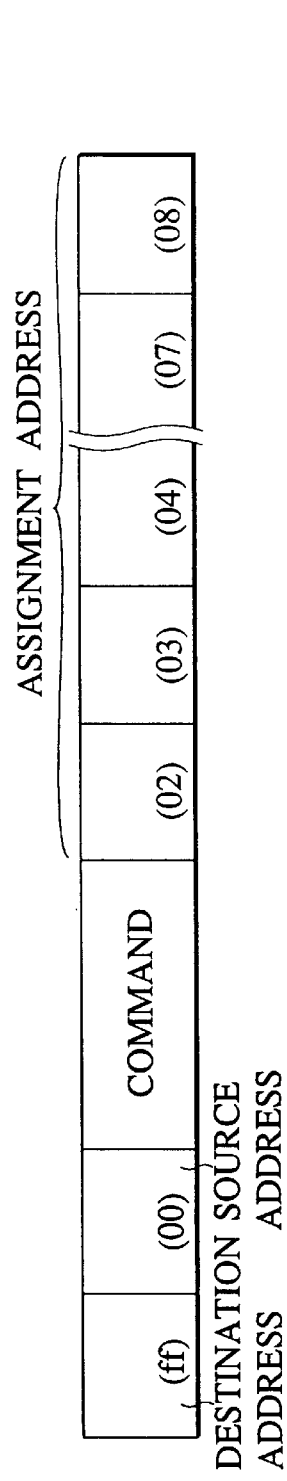
Figure 5C:
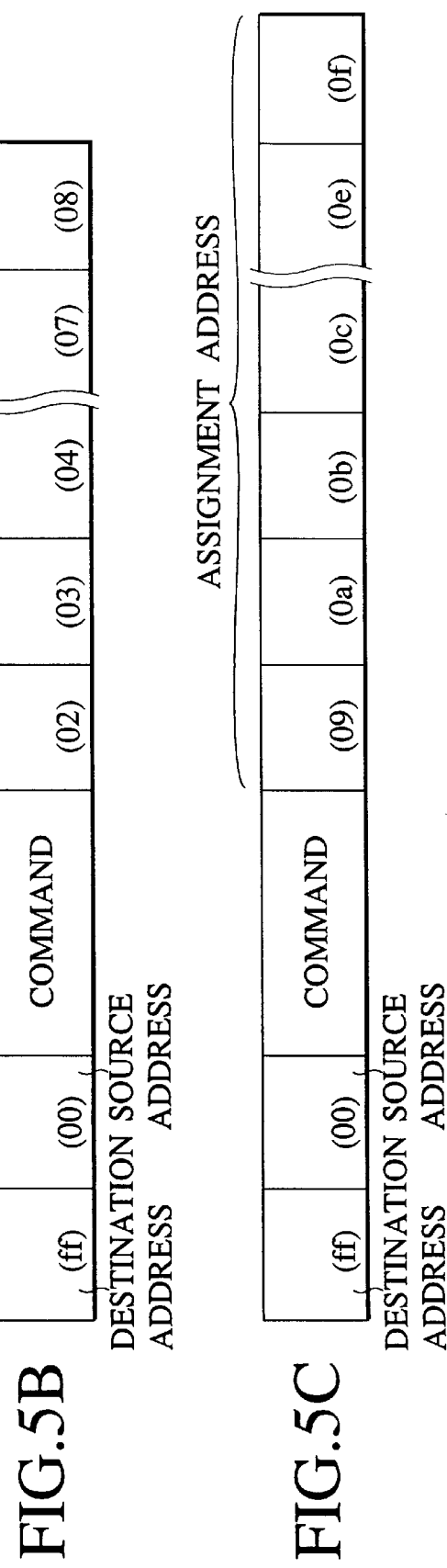

If no unused integer is found as the result of checking in step S9, that is, if all the assignment addresses in the assignment address description area were used for assignment to the communication stations when the communication frame circulated around the communication system 1, source communication station A generates a communication frame whose integers (assignment addresses) in the assignment address description area have been updated as shown in FIG. 5C (step S11). Then, source communication station A sequentially executes step 3 and the following steps.

On the other hand, if one or more integers are found as the result of checking in step S9, that is, if there are one or more assignment addresses in the assignment address description area after the communication frame circulated around the communication system 1, source communication station A terminates the initialization of the communication stations in the communication system 1 (step S13).

Next, the processing flow of destination communication stations B, C, and D is described with destination communication station B as an example. First, destination communication station B performs address temporary assignment processing in which it assigns the address of "ff" to itself (step S21).

Then, the receiving I/F 7 of destination communication station B waits for a communication frame to be sent, via the data transmission line 3, from communication station A which is the upstream communication station (step S23).

When destination communication station B receives the communication frame containing the destination address of "ff" which is temporarily assigned to communication station B, it checks the assignment address description area of the received communication frame to see if the area contains one or more unused integers(step S25). Note that an integer is an example of an assignment address.

When no unused integer is found as the result of checking in step S25, that is, when the assignment addresses in the assignment address description area were assigned to other communication stations as their addresses before the communication frame arrived communication station B, the sending I/F 21 of destination communication station B sends the communication frame containing no unused integer to communication station C which is one of destination communication stations B, C, and D having temporarily-assigned address of "ff" and which is located in the downstream of communication station B (step S27).

On the other hand, when one or more integers are found as the result of checking in step S25, that is, when the assignment address description area of the received communication frame contains unused assignment addresses, destination communication station B extracts the first integer (01) from the integers remaining in the assignment address description area. Then, it shifts the remaining integers one position to the left to generate the communication frame whose assignment address description area has been updated as shown in FIG. 5B (step S29) and sends the generated communication frame to communication station C which is one of destination communication stations B, C, and D having temporarily-assigned address of "ff" and which is located in the downstream of communication station B (step S31).

The address decoder 9 of destination communication station B updates the temporarily-assigned address (ff) stored in the address table 25 with the integer (01) extracted in step S29 to assign the address to destination communication station B itself (step S33). After assigning the address to itself, destination communication station B terminates address initialization processing for itself (step S35).

In the above description of the processing flow, source communication station A assigns the address of "00" to itself before initializing the addresses of the communication stations, and each of destination communication stations B, C, and D temporarily assigns the address of "ff" to itself. The present invention is not limited to these addresses. That is, source communication station A may assign any value, other than "00", to itself, while destination communication stations B, C, and D may temporarily assign any value, other than the one used by source communication station, to themselves.

In step S29 in the processing flow in the above description, destination communication station B extracts the first integer (01) from the integers (assignment addresses) remaining in the assignment address description area, shifts the remaining integers one position to the left, and generates the communication frame whose assignment address description area has been updated. The present invention is not limited to this method. That is, destination communication station B may extract an integer in any position other than the first position, and generate the communication frame whose assignment address description area has been updated by shifting the integers after that integer one position to the left.

Further, in step S29 in the above description, destination communication station B extracts an integer (assignment addresses) from the integers remaining in the assignment address description area and shifts the remaining integers (assignment addresses) one position to the left. The present invention is not limited to this method. That is, after extracting an integer from the integers (assignment addresses) remaining in the assignment address description area, the position from which the integer was extracted may be filled with a predetermined value other than the integer (assignment address).

In addition, address assignment processing in step S33 may be performed before sending the communication frame in step S31.

Thus, in the address assignment method in accordance with the first embodiment of the present invention and the communication system to which this address assignment method is applied, when a destination communication station receives a communication frame containing a destination address matching its own address and containing unused assignment addresses in the assignment address description area, it extracts one of unused assignment addresses, generates the communication frame whose assignment address description area has been updated by extracting the assignment address, and updates its own address stored in the means for storing its own address with the extracted assignment address to assigns the address to itself. The communication station then sends the generated communication frame to the next communication station so that the communication frame may circulate among a plurality of communication stations. This allows each of the plurality of communication stations to assign a unique address to itself through an easy procedure and, at the same time, increases the throughput of the whole system at address assignment time.

Next, the communication system 1 to which the address assignment method according to the second embodiment of the present invention is described with emphasis on the difference between the second embodiment and the first embodiment described above.

FIGS. 6A and 6B show the format of the communication frame that circulates among the stations in the communication system 1 to which the address assignment method according to the second embodiment is applied. In the second embodiment, identification flag description areas, each indicating whether or not the corresponding assignment address is used, are added to the communication frame information description area of the communication frame according to the first embodiment. For example, the identification flag indicates that the assignment address is not used when it is "0" and that the assignment address is used when it is "1". In FIG. 6A, the identification flag is at the beginning of each assignment address. In FIG. 6B, the identification flag is provided for each of a plurality of assignment addresses but the identification flag description area composed of a plurality of identification flags is separate from the assignment address description area composed of a plurality of assignment addresses.

Figure 4:
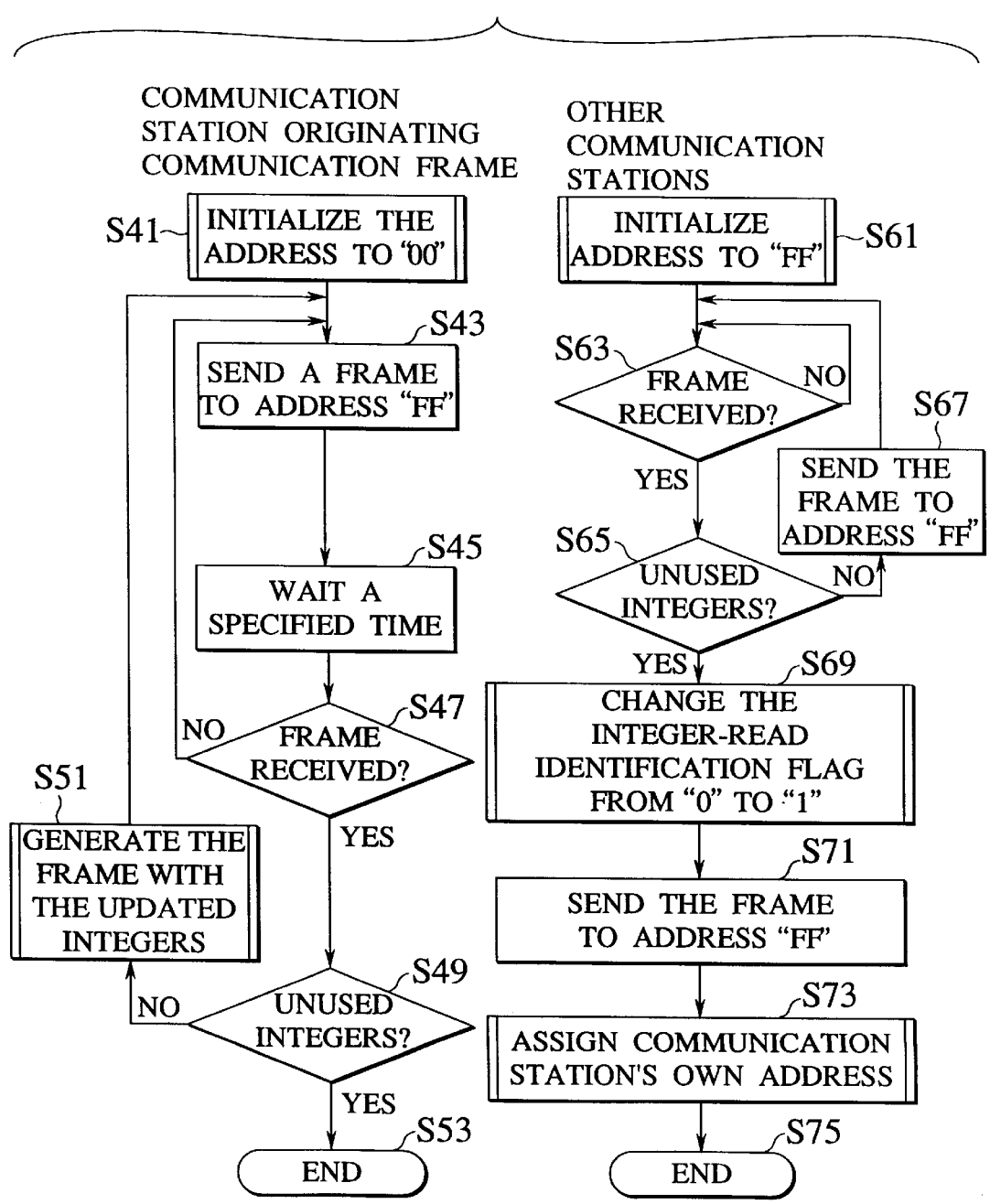
FIG. 4 is a flowchart showing a processing procedure for the address assignment method used in the second embodiment of the present invention.

In the address assignment method used in the second embodiment of the present invention, the processing flow of source communication station A is the same as that of the first embodiment but the processing flow of destination communication stations B, C, and D differs from that of the first embodiment in the processing of step S69, as shown in FIG. 4.

That is, in step S29 of the first embodiment, destination communication station B extracts the first integer (01) from the integers (assignment addresses) remaining in the assignment address description area, shifts the remaining integers one position to the left, and generates the communication frame whose assignment address description area has been updated. On the other hand, in step S69 of the second embodiment, destination communication station B searches the integers (assignment addresses) remaining in the assignment address description area for one or more integers whose identification flag is "0" indicating an unused assignment address, as shown in FIGS. 6A and 6B , and reads the first integer of the unused integers that have been found. Then, destination communication station B generates the communication frame by setting the identification flag corresponding to the integer that was read to "1" indicating that the address has been used.

Thus, in the address assignment method in accordance with the second embodiment of the present invention and the communication system to which this address assignment method is applied, when a destination communication station receives a communication frame containing the destination address matching its own address and containing unused assignment addresses in the assignment address description area, it reads one of unused assignment addresses, generates the communication frame whose identification flag description area has been updated by changing the identification flag corresponding to the assignment address that was read, and updates its own address stored in the means for storing its own address with the assignment address that was read. The destination communication station assigns its own address in this manner and sends the generated communication frame to the next communication station so that the communication frame may circulate among a plurality of communication stations. This allows each of the plurality of communication stations to assign a unique address to itself through an easy procedure and, at the same time, increases the throughput of the whole system at address assignment time.

As a variation of the second embodiment, the identification flag may be changed so that it indicates the assignment address to be used next. In this case, for example, the identification flag corresponding to the assignment address to be used next is set to "1" and all other identification flags are set to "0".

In the address assignment method used in the variation, source communication station A sends the communication frame in which only the identification flag corresponding to the first assignment address of a plurality of assignment addresses in the assignment address description area is set to "1". Upon receiving this communication frame, destination communication station B searches for the assignment address to be assigned next based on the contents of the identification flag, assigns the assignment address that was searched for as the address of its own, and sends the communication frame in which only the identification flag corresponding to the next assignment address is "1". A destination communication station which receives the communication frame in which the identification flag corresponding to the last assignment address is "1" assigns the address as its own address, and sends the communication frame in which all identification flags are "0". A destination communication station which receives the communication frame in which all identification flags are "0" does not assign its own address but sends the received communication frame to the next communication station. The subsequent operations are the same as those of the example described in the second embodiment.

Next, the communication system 1 to which the address assignment method according to the third embodiment of the present invention is described with emphasis on the difference between the third embodiment and the first or second embodiment described above.

Figure 9A:
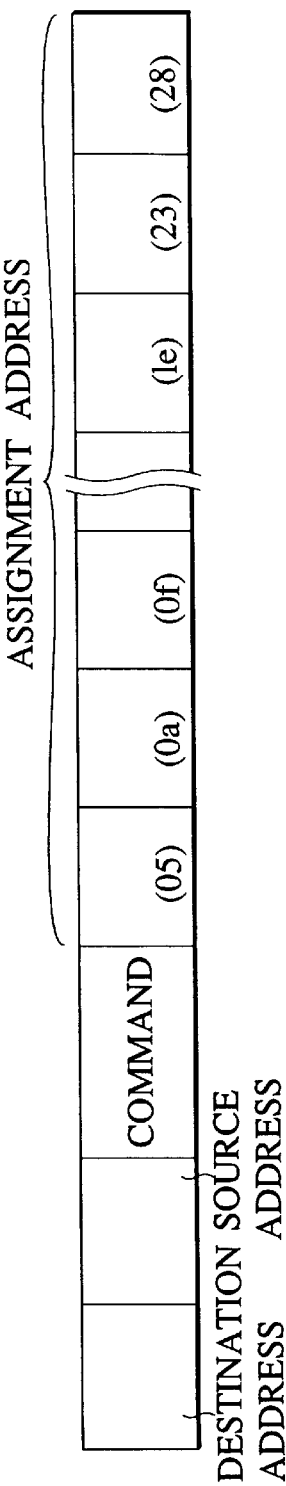
FIG. 9 is a diagram showing an example of the format of a communication frame used in a communication system to which the address assignment method according to the third embodiment of the present invention is applied.
Figure 9B:
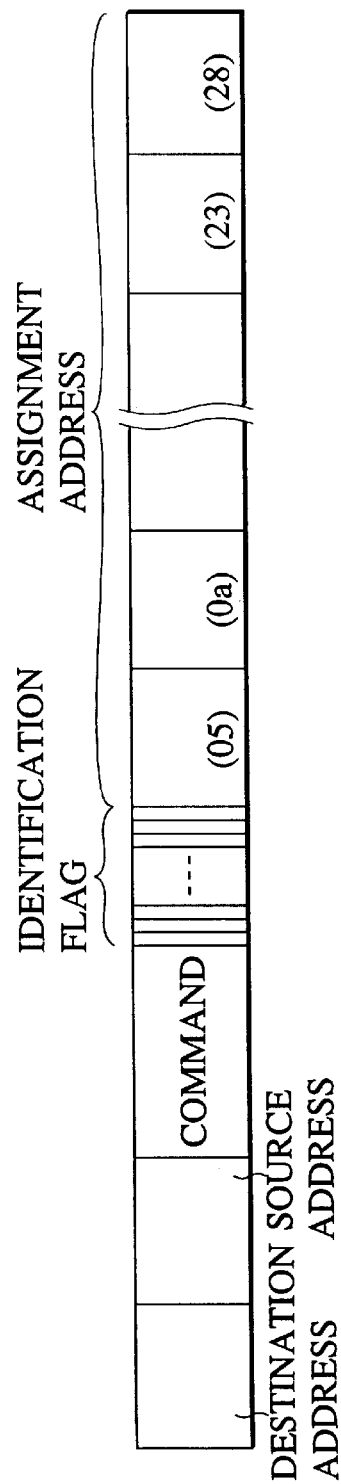

As shown in FIG. 9A, the communication frame that circulates among the stations in the communication system 1 to which the third embodiment is applied has the assignment address description area, similar to the one used in the first embodiment, which contains a plurality of ascending assignment addresses each containing a number m times as large as a cardinal number such as 5 (m is a natural number). Also, as shown in FIG. 9B, the communication frame used in a variation of the third embodiment has the assignment address description area, similar to the one used in the second embodiment, which contains a plurality of ascending assignment addresses each containing a number m times as large as a cardinal number such as 5 (m is a natural number).

The cardinal number described above is determined considering the maximum number of child nodes (functional units N) that may be connected to one communication station. For example, when up to four child nodes may be connected to one communication station, each communication station requires five addresses because it requires one address for its own and four child addresses for four child nodes. In this case, the cardinal number of "5" is used.

Figure 8:
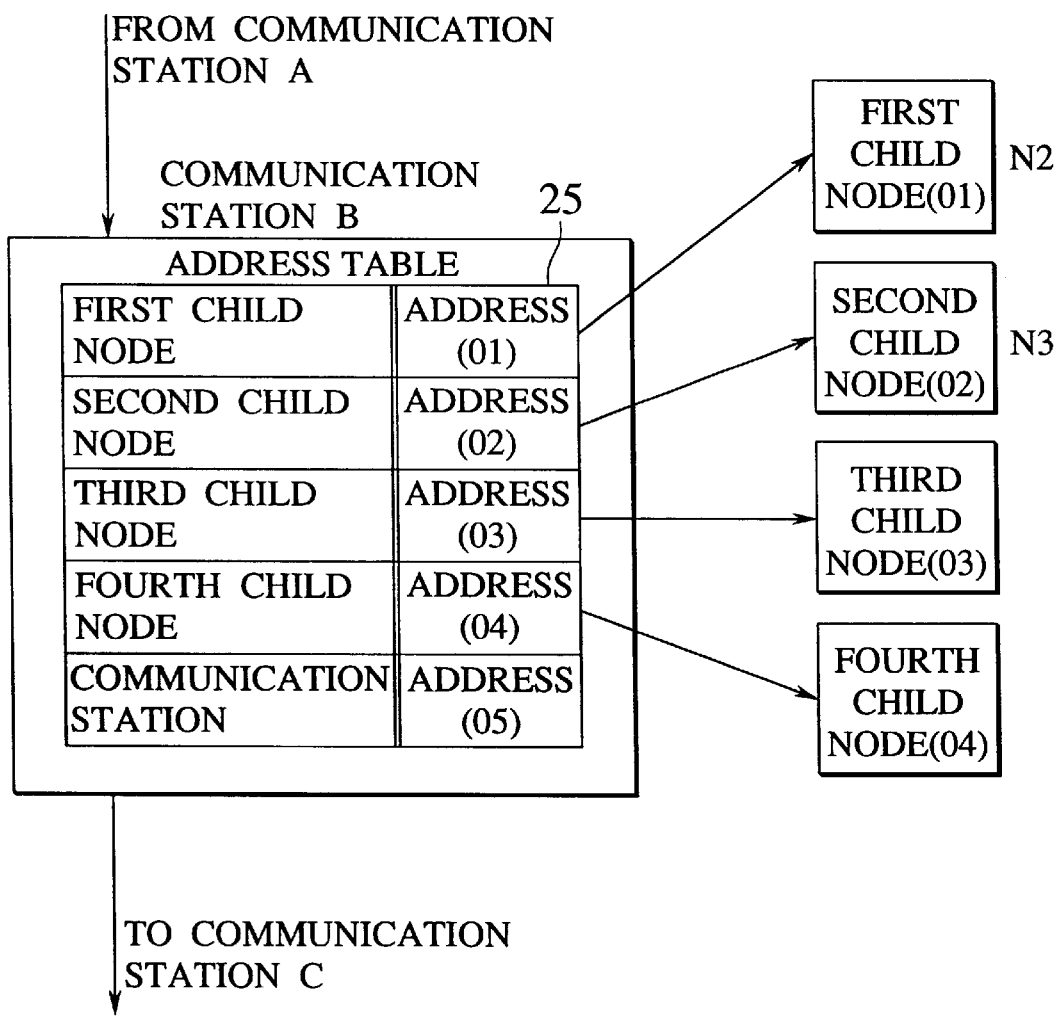
FIG. 8 is a diagram explaining a communication system to which the address assignment method according to the third embodiment of the present invention is applied.

A communication station of the communication system 1 to which the address assignment method according to the third embodiment is applied has the address table 25, such as the one shown in FIG. 8, containing its own address and the addresses of one to four child nodes (functional units N) connected to the communication station. Each of the one to four unique child node addresses is distributed to the corresponding child node. It should be noted that the address table 25 has the unique child addresses to be used by one to four child nodes even if all the nodes corresponding to those addresses are not connected to the communication station. When one new child node is connected to the communication station, one of the child addresses is selected from the plurality of child addresses stored in the address table 25 and sent to the child node for use as its address. This allows, at any time after system creation, a new child node to be added and, at the same time, to be identified as one of child nodes connected to the communication station. As a result, the address assignment method compatible with the plug-and-play function and a communication system to which this address assignment method is applied may be implemented.

Figure 7:
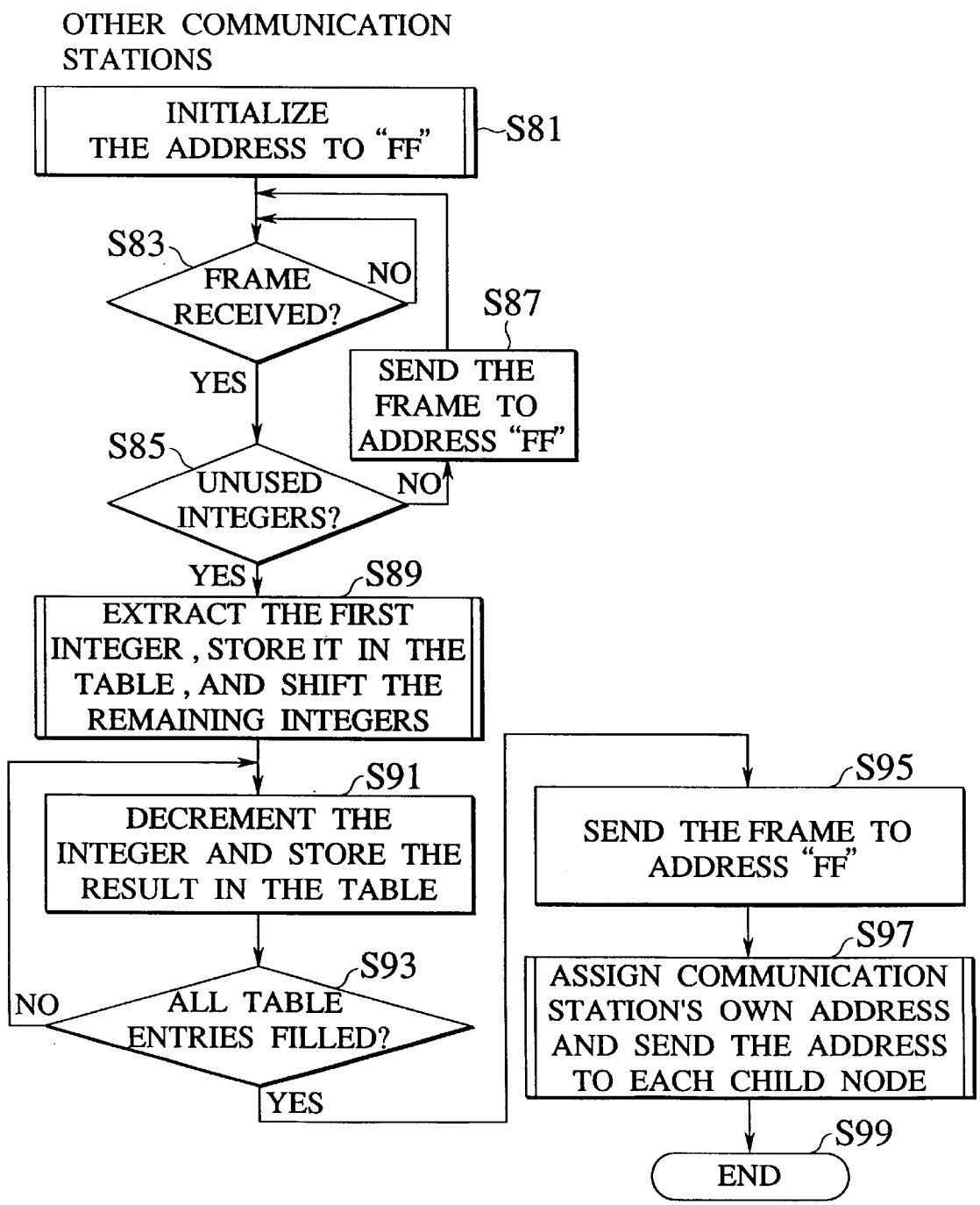
FIG. 7 is a flowchart showing a processing procedure for the address assignment method used in the third embodiment of the present invention.

As shown in FIG. 7, the processing flow of destination communication stations B, C, and D in the third embodiment of the present invention is different from that in the first embodiment as described below. The processing flow of the source communication station A, which is similar to that of the first embodiment, is omitted.

The processing flow of destination communication stations B, C, and D is described below with destination communication station B as an example. As shown in FIG. 7, destination communication station B performs address temporary assignment processing and temporarily assigns its own address to "ff" (step S81).

Then, the receiving I/F 7 of destination communication station B waits for communication station A, located in its upstream, to send a communication frame over the data transmission line 3 (step S83).

When destination communication station B receives a communication frame containing the address of "ff" which is the address temporality assigned to itself, it checks the received communication frame if its assignment address description area contains unused integers that will be used as assignment addresses (step S85).

When no unused integer is found as the result of checking in step S85, that is, when the assignment addresses in the assignment address description area were assigned to other communication stations as their addresses before the communication frame arrived communication station B, the sending I/F 21 of destination communication station B sends the communication frame containing no unused integer to communication station C which is one of destination communication stations B, C, and D having temporarily-assigned address of "ff" and which is located in the downstream of communication station B (step S87).

On the other hand, when one or more integers are found as the result of checking in step S85, that is, when the assignment address description area of the received communication frame contains unused assignment addresses, destination communication station B extracts the first integer (5 m) from the integers remaining in the assignment address description area as shown in FIG. 9A and stores the extracted address into the address table 25 as its own address instead of (ff). It then shifts the remaining integers one position to the left to generate the updated communication frame (step S89). In addition, as shown in FIG. 8, destination communication station B sequentially decrements the extracted integer to generate (5 m−1), (5 m−2), (5 m−3), and (5 m−4) and stores them as the child addresses of the first to fourth child nodes connected to communication station B (step S91).

Destination communication station B repeats step S91 until all child addresses are stored in address table 25. When all child addresses are stored in the address table 25 (step S93), destination communication station B sends the communication frame generated in step S89 to communication station C which is one of destination communication stations B, C, and D having temporarily-assigned address of "ff" and which is located in the downstream of communication station B (step S95).

Then, as shown in FIG. 8, destination communication station B assigns the integer, stored in the position corresponding to destination communication station B in the address table 25, to itself and distributes the integers (5 m−1), (5 m−2), (5 m−3), and (5 m−4), stored in the positions corresponding to the first to fourth child nodes connected to destination communication station B, to the child nodes (step S97). After that, destination communication station B terminates address initialization processing for itself and the child nodes (step S99).

In step S89, destination communication station B extracts the first integer (5 m) from the integers (assignment addresses) remaining in the assignment address description area, stores it in the address table 25, shifts the remaining integers one position to the left, and generates the communication frame whose assignment address description area has been updated. The present invention is not limited to this method. That is, destination communication station B may extract an integer in any position other than the first position, store it in the address table 25, and generate the communication frame whose assignment address description area is updated by shifting the integers after that integer one position to the left.

In addition, address assignment processing for its own address and the child addresses in step S97 may be performed before sending the communication frame in step S95.

Meanwhile, the third embodiment of the address assignment method has another variation. This variation performs the same basic operation as that of the third embodiment. However, as in the second embodiment described above, the identification flags each indicating whether the corresponding assignment address is used or not are provided. In this variation, when an assignment address is used for the address of a communication station, the assignment address is not extracted but the corresponding identification flag is turned on to indicate that the address is used. This is the difference between the variation and the third embodiment described above.

In the above description of the third embodiment, the procedure for assigning a child address to each child node connected to a communication station is described. It should be noted, however, that this invention is not limited to this method. For example, "ff" may be temporarily assigned to a communication station and to the child nodes connected to the communication station, assuming that the communication station and the child nodes are on the same level. In this case, addresses may be assigned to the communication station and to the child nodes connected to the communication station at the same time.

Thus, in the address assignment method in accordance with the third embodiment of the present invention and the communication system to which this address assignment method is applied, when a destination communication station receives a communication frame containing the destination address matching its own address and containing unused assignment addresses in the assignment address description area, it extracts one of unused assignment addresses and generates the communication frame whose assignment address description area has been updated by extracting the assignment address. The destination communication station stores the child address values, generated by performing a predetermined operation on the extracted assignment address, into the means for storing child addresses. It then assigns its own address by updating its own address stored in the means for storing its own address with the extracted address value and assigns the addresses of child nodes by sending the child addresses stored in the means for storing child addresses to child nodes. The destination communication station sends the generated communication frame to the next communication station so that the communication frame may circulate among a plurality of communication stations. This allows each of the plurality of communication stations to assign a unique address to itself and to each of its child nodes through an easy procedure and, at the same time, increases the throughput of the whole system at address assignment time.

In the address assignment method in accordance with the variation of the third embodiment of the present invention and the communication system to which this address assignment method is applied, when a destination communication station receives a communication frame containing the destination address matching its own address and containing unused assignment addresses in the assignment address description area, it reads one of unused assignment addresses and generates the communication frame whose assignment address description area has been updated by changing the identification flag to the value indicating that the address is used. The destination communication station then stores the child address values, generated by performing a predetermined operation on the assignment address that was read, into the means for storing child addresses. It then assigns its own address by updating its own address stored in the means for storing its own address with the address value that was read and assigns the addresses of child nodes, connected to the destination communication station, by sending the child addresses stored in the means for storing child addresses to the child nodes. The destination communication station sends the generated communication frame to the next communication station so that the communication frame may circulate among a plurality of communication stations. This allows each of the plurality of communication stations to assign a unique address to itself and to each of the child nodes connected to the station through an easy procedure and, at the same time, increases the throughput of the whole system at address assignment time.

The present invention is not limited to the embodiments described above but may be modified within its scope as set out in the claims.

For example, the total number of communication stations may be stored in the source communication station in advance. When the communication frame has returned to the source communication station after circulating around the communication system, the source communication station compares the total number of communication stations stored in advance with the total number of assignment addresses remaining in the assignment address description area of the communication frame that has returned. This makes it possible to check if all communication stations have their addresses assigned.

Finally, in the embodiment, although the station address of "ff" is temporarily assigned to the communication stations other than the source communication station during initialization, the present invention is not limited to this address. Instead of "ff", some other address, such as "8f" which is a broadcast address, may be broadcast to other communication stations if it is set up in advance.

What is claimed is:

1. For use in a communication system composed of a plurality of communication stations capable of exchanging data with each other via a data transmission line, an address assignment method for circulating a communication frame among said plurality of communication stations to assign an address to each of said plurality of communication stations so that each communication station may be identified, said communication frame comprising:
   a destination address description area in which a destination address of a destination communication station to which the communication frame is sent is described; and
   an assignment address description area in which assignment addresses to be assigned to said plurality of communication stations are described,
each of said plurality of communication stations comprising means for storing its own address,
said address assignment method comprising the steps of:
   storing a predetermined value into the means for storing its own address to set up the assignment of the address by a source communication station which is one of said plurality of communication stations and from which said communication frame is originated;
   storing a common temporary address value, other than said predetermined value, into the means for storing its own address to temporary assign the common temporary address to the address by said destination communication station;
   generating the communication frame whose destination address description area contains said common temporary address and whose assignment address description area contains said assignment addresses and sending the generated communication frame to said destination communication station by said source communication station; and
   when the destination address in the communication frame received via said data transmission line matches the address stored in the means for storing its own address of the station and when the assignment address description area of the communication frame contains at least one unused addresses, extracting one of the unused assignment addresses, generating the communication frame whose assignment address description area has been updated by extracting the assignment address, updating the address stored in the means for storing its own address with said extracted assignment address to set up the assignment of the address of the station, and sending said generated communication frame to the next communication station by said destination communication station.

2. The address assignment method according to claim 1, wherein, when the destination address in the communication frame received via said data transmission line matches the address stored in the means for storing its own address of the station but when the assignment address description area of the communication frame does not contain unused addresses, said destination communication station sends the received communication frame unchanged to the next communication station without setting up the assignment of the address of the station.

3. The address assignment method according to claim 1, wherein, when the destination address in the communication frame received via said data transmission line matches the address stored in the means for storing its own address of the station but when the assignment address description area of the communication frame does not contain unused addresses, said destination communication station sends the received communication frame unchanged to the next communication station without setting up the assignment of the address of the station, and wherein, when the assignment address description area of the communication frame received via said data transmission line does not contain unused assignment addresses, said source communication station generates the communication frame whose destination address description area contains said temporary common address and whose assignment address description area contains updated assignment addresses and sends the generated communication frame to said destination communication station again.

4. For use in a communication system composed of a plurality of communication stations capable of exchanging data with each other via a data transmission line, an address assignment method for circulating a communication frame among said plurality of communication stations to assign an address to each of said plurality of communication stations so that each communication station may be identified, said communication frame comprising:
  a destination address description area in which a destination address of a destination communication station to which the communication frame is sent is described;
  an assignment address description area in which assignment addresses to be assigned to said plurality of communication stations are described, and
  an identification flag description area which is provided for each of the assignment addresses and which contains an identification flag used to identify whether or not the assignment address is used,
  each of said plurality of communication stations comprising means for storing its own address,
said address assignment method comprising the steps of:
  storing a predetermined value into the means for storing its own address to set up the assignment of the address by a source communication station which is one of said plurality of communication stations and from which said communication frame is originated;
  storing a common temporary address value, other than said predetermined value, into the means for storing its own address to temporary assign the common temporary address to the address by said destination communication station;
  generating the communication frame whose destination address description area contains said common temporary address, whose assignment address description area contains said assignment addresses, and whose identification flag description areas each contain the identification flag indicating said assignment address is unused and sending the generated communication frame to said destination communication station by said source communication station; and
  when the destination address in the communication frame received via said data transmission line matches the address stored in the means for storing its own address of the station and when the assignment address description area of the communication frame contains at least one unused addresses, reading one of the unused assignment addresses, generating the communication frame whose identification flag description area corresponding to the assignment address that was read has been updated to the value indicating that the assignment address is used, updating the address stored in the means for storing its own address with said assignment address that was read to set up the assignment of the address of the station, and sending said generated communication frame to the next communication station by said destination communication station.

5. The address assignment method according to claim 4, wherein, when the destination address in the communication frame received via said data transmission line matches the address stored in the means for storing its own address of the station but when the assignment address description area of the communication frame does not contain unused addresses, said destination communication station sends the received communication frame unchanged to the next communication station without setting up the assignment of the address of the station.

6. The address assignment method according to claim 4, wherein, when the destination address in the communication frame received via said data transmission line matches the address stored in the means for storing its own address of the station but when the assignment address description area of the communication frame does not contain unused addresses, said destination communication station sends the received communication frame unchanged to the next communication station without setting up the assignment of the address of the station, and wherein, when the assignment address description area of the communication frame received via said data transmission line does not contain unused assignment addresses, said source communication station generates the communication frame whose destination address description area contains said temporary common address, whose assignment address description area contains updated assignment addresses, and whose identification flag description areas each contain the identification flag indicating that the assignment address is unused and sends the generated communication frame to said destination communication station.

7. For use in a communication system composed of a plurality of communication stations, to which child nodes are connected, capable of exchanging data with each other via a data transmission line, an address assignment method for circulating a communication frame among said plurality of communication stations to assign an address to each of said plurality of communication stations and said child nodes so that each communication station and child node may be identified, said communication frame comprising:
  a destination address description area in which a destination address of a destination communication station to which the communication frame is sent is described; and
  an assignment address description area in which assignment addresses to be assigned to said plurality of communication stations are described,
  each of said plurality of communication stations comprising means for storing its own address and means for storing the addresses of child nodes connected to the station,
said address assignment method comprising the steps of:
  storing a predetermined value into the means for storing its own address to set up the assignment of the address by a source communication station which is one of said plurality of communication stations and from which said communication frame is originated;
  storing a common temporary address value, other than said predetermined value, into the means for storing its own address to temporary assign the common temporary address to the address by said destination communication station;
  generating the communication frame whose destination address description area contains said common temporary address and whose assignment address description area contains said assignment addresses and sending the generated communication frame to said destination communication station by said source communication station; and when the destination address in the communication frame received via said data transmission line matches the address stored in the means for storing its own address of the station and when the assignment address description area of the communication frame contains at least one unused addresses, extracting one of the unused assignment addresses, generating the communication frame whose assignment address description area has been updated by extracting the assignment address, storing child address values, obtained by performing a predetermined operation on said extracted assignment address, into said means for storing child addresses, updating the address stored in the means for storing its own address with said extracted assignment address to set up the assignment of the address of the station, sending the child addresses stored in the means for storing child addresses to the child nodes connected to the station to set up the assignment of the address of each of the child nodes, and sending said generated communication frame to the next communication station by said destination communication station.

8. The address assignment method according to claim 7, wherein, when the destination address in the communication frame received via said data transmission line matches the address stored in the means for storing its own address of the station and when the assignment address description area of the communication frame contains at least one unused addresses, said destination communication station extracts one of the unused assignment addresses, generates the communication frame whose assignment address description area has been updated by extracting the assignment address, stores a plurality of child address values sequentially into said means for storing child addresses by repeatedly performing the predetermined operation on said extracted assignment address, updates the address stored in the means for storing its own address with said extracted assignment address to set up the assignment of the address of the station, sends the child addresses stored in the means for storing child addresses to the child nodes connected to the station to set up the assignment of the address of each of the child nodes, and sends said generated communication frame to the next communication station.

9. The address assignment method according to claim 8, wherein, when a new child node is connected to the destination communication station, said destination communication station sends one of said plurality of child addresses stored in the means for storing child addresses to said newly-connected child node to set up the assignment of the address of the child node.

10. For use in a communication system composed of a plurality of communication stations, to which child nodes are connected, capable of exchanging data with each other via a data transmission line, an address assignment method for circulating a communication frame among said plurality of communication stations to assign an address to each of said plurality of communication stations and to said child nodes so that each communication station and child node may be identified, said communication frame comprising:

a destination address description area in which a destination address of a destination communication station to which the communication frame is sent is described;

an assignment address description area in which assignment addresses to be assigned to said plurality of communication stations are described, and an identification flag description area which is provided for each of the assignment addresses and which contains an identification flag used to identify whether or not the assignment address is used, each of said plurality of communication stations comprising means for storing its own address and means for storing the addresses of child nodes connected to the station, said address assignment method comprising the steps of:

storing a predetermined value into the means for storing its own address to set up the assignment of the address by a source communication station which is one of said plurality of communication stations and from which said communication frame is originated;

storing a common temporary address value, other than said predetermined value, into the means for storing its own address to temporary assign the common temporary address to the address by said destination communication station;

generating the communication frame whose destination address description area contains said common temporary address, whose assignment address description area contains said assignment addresses, and whose identification flag description areas each contain the identification flag indicating said assignment address is unused and sending the generated communication frame to said destination communication station by said source communication station; and when the destination address in the communication frame received via said data transmission line matches the address stored in the means for storing its own address of the station and when the assignment address description area of the communication frame contains at least one unused addresses, reading one of the unused assignment addresses, generating the communication frame whose identification flag description area corresponding to the assignment address that was read has been updated to the value indicating that the assignment address is used, storing child address values, obtained by performing a predetermined operation on said assignment address that was read, into said means for storing child addresses, updating the address stored in the means for storing its own address with said assignment address that was read to set up the assignment of the address of the station, sending the child addresses stored in the means for storing child addresses to the child nodes connected to the station to set up the assignment of the address of each of the child nodes, and sending said generated communication frame to the next communication station by said destination communication station.

11. The address assignment method according to claim 10, wherein, when the destination address in the communication frame received via said data transmission line matches the address stored in the means for storing its own address of the station and when the assignment address description area of the communication frame contains at least one unused addresses, said destination communication station reads one of the unused assignment addresses, generates the communication frame whose identification flag description area corresponding to the assignment address that was read has been updated to the value indicating that the assignment address is used, stores a plurality of child address values sequentially into said means for storing child addresses by repeatedly performing the predetermined operation on said assignment address that was read, updates the address stored in the means for storing its own address with said assignment address that was read to set up the assignment of the address of the station, sends the plurality of child addresses stored in the means for storing child addresses to the child nodes connected to the station to set up the assignment of the address of each of the child nodes, and sends said generated communication frame to the next communication station.

12. The address assignment method according to claim 11, wherein, when a new child node is connected to the destination communication station, said destination communication station sends one of said plurality of child addresses stored in the means for storing child addresses to said newly-connected child node to set up the assignment of the address of the child node.

13. A communication system which is composed of a plurality of communication stations capable of exchanging data with each other via a data transmission line and to which an address assignment method for circulating a communication frame among said plurality of communication stations to assign an address to each of said plurality of communication stations so that each communication station may be identified is applied, said communication frame comprising:
 a destination address description area in which a destination address of a destination communication station to which the communication frame is sent is described; and
 an assignment address description area in which assignment addresses to be assigned to said plurality of communication stations are described,
 each of said plurality of communication stations comprising means for storing its own address,
said communication system comprising:
 a source communication station which is one of said plurality of communication stations and from which said communication frame is originated, comprising:
  source address assignment means for storing a predetermined value into the means for storing its own address to set up the assignment of a source address;
  source communication frame generation means for generating the communication frame whose destination address description area contains a common temporary address value, other than said predetermined value, and whose assignment address description area contains said assignment addresses; and
  source communication frame sending means for sending the communication frame from the source communication frame generation means to said destination communication station, and
said destination communication station comprising:
 temporary address assignment means for temporarily assigning said common temporary address to its own address by storing said common temporary address in said means for storing its own address;

assignment address value extraction means for extracting one of unused assignment addresses when the destination address in the communication frame received via said data transmission line matches the address stored in the means for storing its own address of the station and when the assignment address description area of the communication frame contains at least one unused addresses;

destination communication frame generation means for generating the communication frame whose assignment address description area has been updated by extracting the assignment address by said assignment address value extraction means;

destination address assignment means for updating the address stored in the means for storing its own address with said extracted assignment address to set up the assignment of the address of the station; and destination communication frame sending means for sending the communication frame sent from said destination communication frame generation means to the next communication station.

14. The communication system according to claim 13 wherein, when the destination address in the communication frame received via said data transmission line matches the address stored in the means for storing its own address of the station but when the assignment address description area of the communication frame does not contain unused addresses, said destination communication frame generation means sends the received communication frame unchanged to the next communication station without updating the received communication frame.

15. The communication system according to claim 13 wherein, when the assignment address description area of the communication frame received via said data transmission line does not contain unused assignment addresses, said source communication frame generation means generates the communication frame whose destination address description area contains said temporary common address and whose assignment address description area contains updated assignment addresses and wherein said source communication frame sending means sends the communication frame sent from the source communication frame generation means to said destination communication station again.

16. A communication system which is composed of a plurality of communication stations capable of exchanging data with each other via a data transmission line and to which an address assignment method for circulating a communication frame among said plurality of communication stations to assign an address to each of said plurality of communication stations so that each communication station may be identified is applied, said communication frame comprising:
 a destination address description area in which a destination address of a destination communication station to which the communication frame is sent is described;
 an assignment address description area in which assignment addresses to be assigned to said plurality of communication stations are described; and
 an identification flag description area which is provided for each of the assignment addresses and which contains an identification flag used to identify whether or not the assignment address is used,
 each of said plurality of communication stations comprising means for storing its own address,
said communication system comprising:

a source communication station which is one of said plurality of communication stations and from which said communication frame is originated, comprising:
source address assignment means for storing a predetermined value into the means for storing its own address to set up the assignment of a source address;
source communication frame generation means for generating the communication frame whose destination address description area contains a common temporary address value, other than said predetermined value, whose assignment address description area contains said assignment addresses, and whose identification flag description area contains identification flags each indicating that said assignment address is unused; and
source communication frame sending means for sending the communication frame from the source communication frame generation means to said destination communication station, and
said destination communication station comprising:
temporary address assignment means for temporarily assigning said common temporary address to its own address by storing said common temporary address in said means for storing its own address;
assignment address value reading means for reading one of unused assignment addresses when the destination address in the communication frame received via said data transmission line matches the address stored in the means for storing its own address of the station and when the assignment address description area of the communication frame contains at least one unused addresses;
destination communication frame generation means for generating the communication frame whose identification flag description area has been updated by changing the flag corresponding to the assignment address that was read by the assignment address value reading means to the value indicating that the assignment address is used;
destination address assignment means for updating the address stored in the means for storing its own address with said assignment address read by said assignment address value reading means to set up the assignment of the address of the station; and
destination communication frame sending means for sending the communication frame sent from said destination communication frame generation means to the next communication station.

17. The communication system according to claim 16 wherein, when the destination address in the communication frame received via said data transmission line matches the address stored in the means for storing its own address of the station but when the assignment address description area of the communication frame does not contain unused addresses, said destination communication frame generation means sends the received communication frame unchanged to the next communication station without updating the received communication frame.

18. The communication system according to claim 16 wherein, when the assignment address description area of the communication frame received via said data transmission line does not contain unused assignment addresses, said source communication frame generation means generates the communication frame whose destination address description area contains said temporary common address, whose assignment address description area contains updated assignment addresses, and whose identification flag description area contains identification flags each indicating that the assignment address is unused and
wherein said source communication frame sending means sends the communication frame sent from the source communication frame generation means to said destination communication station again.

19. A communication system which is composed of a plurality of communication stations, to which child nodes are connected, capable of exchanging data with each other via a data transmission line and to which an address assignment method for circulating a communication frame among said plurality of communication stations to assign an address to each of said plurality of communication stations and said child nodes so that each communication station may be identified is applied,
said communication frame comprising:
a destination address description area in which a destination address of a destination communication station to which the communication frame is sent is described; and
an assignment address description area in which assignment addresses to be assigned to said plurality of communication stations are described,
each of said plurality of communication stations comprising means for storing its own address and means for storing the addresses of child nodes connected to the station,
said communication system comprising:
a source communication station which is one of said plurality of communication stations and from which said communication frame is originated, comprising:
source address assignment means for storing a predetermined value into the means for storing its own address to set up the assignment of a source address;
source communication frame generation means for generating the communication frame whose destination address description area contains a common temporary address value, other than said predetermined value, and whose assignment address description area contains said assignment addresses; and
source communication frame sending means for sending the communication frame from the source communication frame generation means to said destination communication station, and
said destination communication station comprising:
temporary address assignment means for temporarily assigning said common temporary address to its own address by storing said common temporary address in said means for storing its own address;
assignment address value extraction means for extracting one of unused assignment addresses when the destination address in the communication frame received via said data transmission line matches the address stored in the means for storing its own address of the station and when the assignment address description area of the communication frame contains at least one unused addresses;
operation control means for storing child address values, obtained by performing a predetermined operation on the assignment address value extracted by said assignment address value extraction means, into said child address storing means;
destination communication frame generation means for generating the communication frame whose assignment address description area has been updated by extracting the assignment address by said assignment address value extraction means;

destination address assignment means for updating the address stored in the means for storing its own address with said extracted assignment address to set up the assignment of the address of the station;

child address assignment means for sending the child addresses, stored in said means for storing child addresses, to the child nodes connected to the station to set up the assignment of child node addresses; and destination communication frame sending means for sending the communication frame sent from said destination communication frame generation means to the next communication station.

20. The communication system according to claim 19 wherein said operation control means sequentially stores a plurality of child address values, obtained by repeatedly performing the predetermined operation on the assignment address value extracted by said assignment address value extraction means, into said means for storing child addresses and wherein said child address assignment means sends the plurality of child addresses, stored in said means for storing child addresses, to the child nodes connected to the station to set up the assignment of each child node.

21. The communication system according to claim 20 wherein, when a new child node is connected to the destination communication station, said child address assignment means sends one of the plurality of child addresses stored in said means for storing child addresses to said newly-connected child to set up the assignment of the address of the child node.

22. A communication system which is composed of a plurality of communication stations, to which child nodes are connected, capable of exchanging data with each other via a data transmission line and to which an address assignment method for circulating a communication frame among said plurality of communication stations to assign an address to each of said plurality of communication stations and said child nodes so that each communication station may be identified is applied, said communication frame comprising:
a destination address description area in which a destination address of a destination communication station to which the communication frame is sent is described;
an assignment address description area in which assignment addresses to be assigned to said plurality of communication stations are described, and
an identification description flag area which is provided for each of the assignment addresses and which contains an identification flag used to identify whether or not the assignment address is used,
each of said plurality of communication stations comprising means for storing its own address and means for storing the addresses of child nodes connected to the station, said communication system comprising:
a source communication station which is one of said plurality of communication stations and from which said communication frame is originated, comprising:
source address assignment means for storing a predetermined value into the means for storing its own address to set up the assignment of a source address;
source communication frame generation means for generating the communication frame whose destination address description area contains a common temporary address value, other than said predetermined value, whose assignment address description area contains said assignment addresses, and whose identification flag description areas each contain the identification flag indicating said assignment address is unused; and
source communication frame sending means for sending the communication frame from the source communication frame generation means to said destination communication station, and said destination communication station comprising:
temporary address assignment means for temporarily assigning said common temporary address to its own address by storing said common temporary address in said means for storing its own address;
assignment address value reading means for reading one of unused assignment addresses when the destination address in the communication frame received via said data transmission line matches the address stored in the means for storing its own address of the station and when the assignment address description area of the communication frame contains at least one unused addresses;
operation control means for storing child address values, obtained by performing a predetermined operation on the assignment address value read by said assignment address value reading means, into said child address storing means;
destination communication frame generation means for generating the communication frame whose identification flag description area corresponding to the assignment address that was read by said assignment address value reading means has been updated to the value indicating that the assignment address is used,
destination address assignment means for updating the address stored in the means for storing its own address with said assignment address that was read by said assignment address value reading means to set up the assignment of the address of the station;
child address assignment means for sending the child addresses, stored in said means for storing child addresses, to the child nodes connected to the station to set up the assignment of child node addresses; and
destination communication frame sending means for sending the communication frame sent from said destination communication frame generation means to the next communication station.

23. The communication system according to claim 22 wherein said operation control means sequentially stores a plurality of child address values, obtained by repeatedly performing the predetermined operation on the assignment address value extracted by said assignment address value extraction means, into said means for storing child addresses and wherein said child address assignment means sends the plurality of child addresses, stored in said means for storing child addresses, to the child nodes connected to the station to set up the assignment of each child node.

24. The communication system according to claim 23 wherein, when a new child node is connected to the destination communication station, said child address assignment means sends one of the plurality of child addresses stored in said means for storing child addresses to said newly-connected child node to setup the assignment of the address of the child node.

* * * * *